Jan. 7, 1964    E. TRÜMPELMANN ETAL    3,116,874
DIVISION APPARATUS FOR CALCULATORS
Filed July 20, 1959    20 Sheets-Sheet 1

INVENTORS
Ernst Trümpelmann
Karl Westinger
Ernst Altenburger.

BY
Michael J. Striker
ATTORNEY

INVENTOR
Ernst Trümpelmann
Karl Westinger
Ernst Altenburger

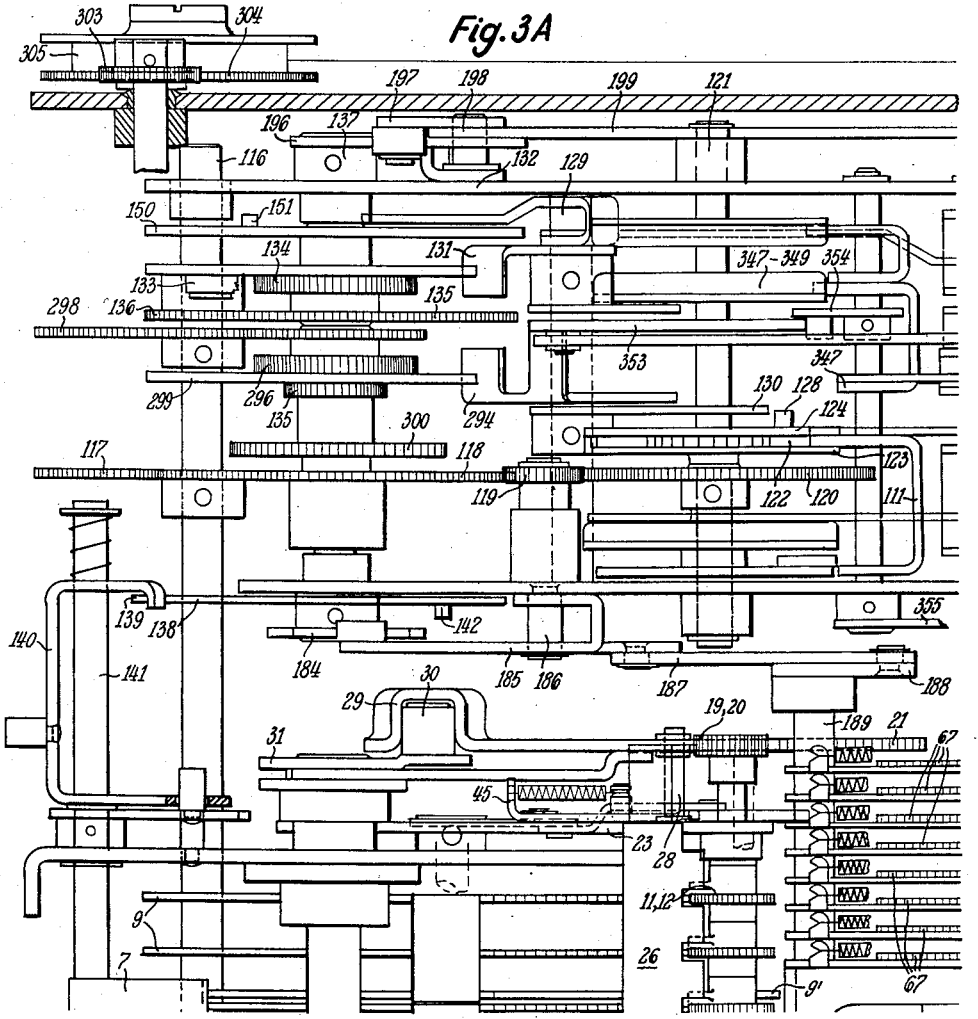

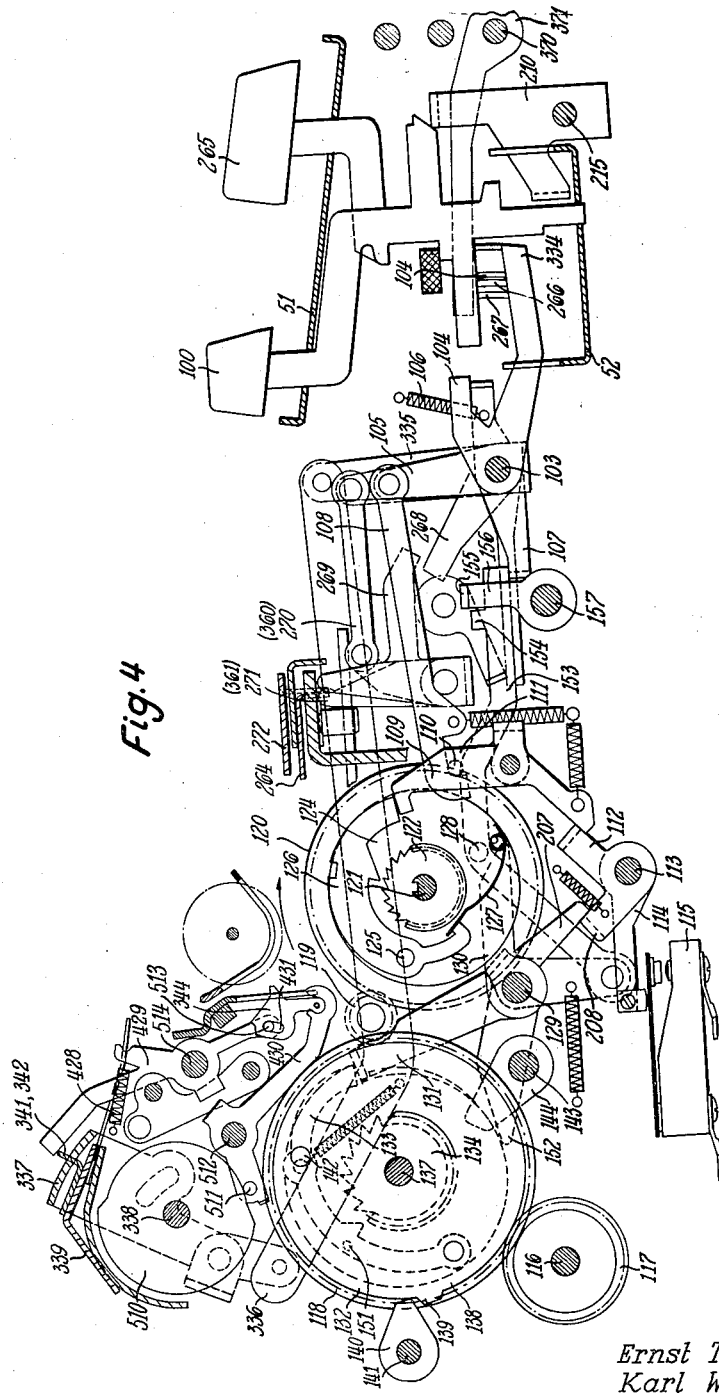

Jan. 7, 1964   E. TRÜMPELMANN ETAL   3,116,874
DIVISION APPARATUS FOR CALCULATORS
Filed July 20, 1959   20 Sheets-Sheet 8

INVENTOR
Ernst Trümpelmann
Karl Weslinger
Ernst Altenburger.
BY
Michael J. Striker
ATTORNEY Jan. 7, 1964　　　E. TRÜMPELMANN ETAL　　　3,116,874
DIVISION APPARATUS FOR CALCULATORS
Filed July 20, 1959　　　　　　　　　　　　　20 Sheets-Sheet 9
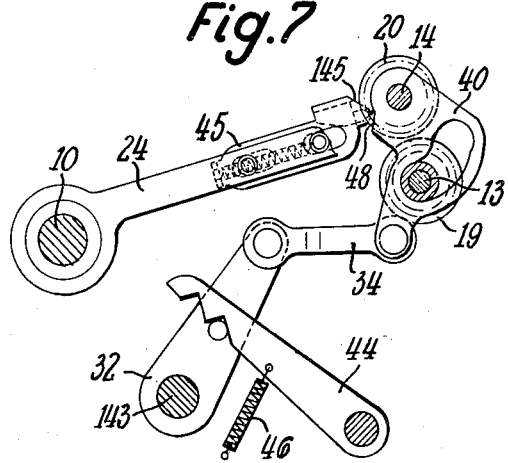
Fig.7
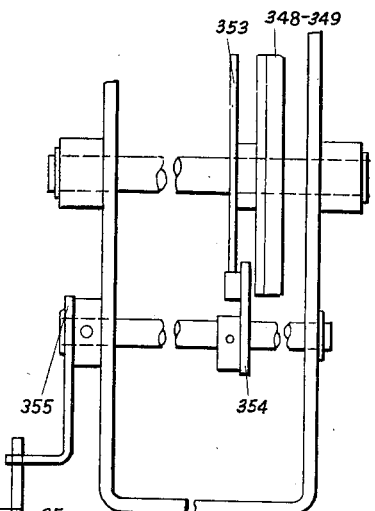
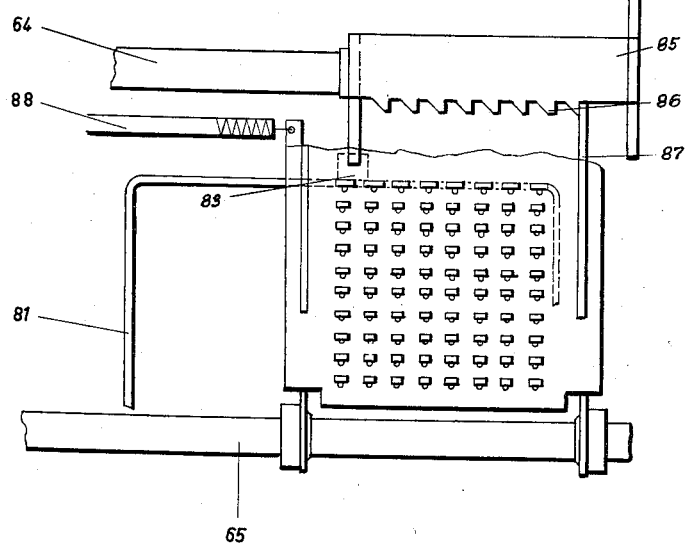
Fig.20
INVENTOR
Ernst Trümpelmann
Karl Westinger
Ernst Altenburger.
BY
Michael S. Striker
ATTORNEY Jan. 7, 1964         E. TRÜMPELMANN ETAL         3,116,874
             DIVISION APPARATUS FOR CALCULATORS
Filed July 20, 1959                         20 Sheets-Sheet 10
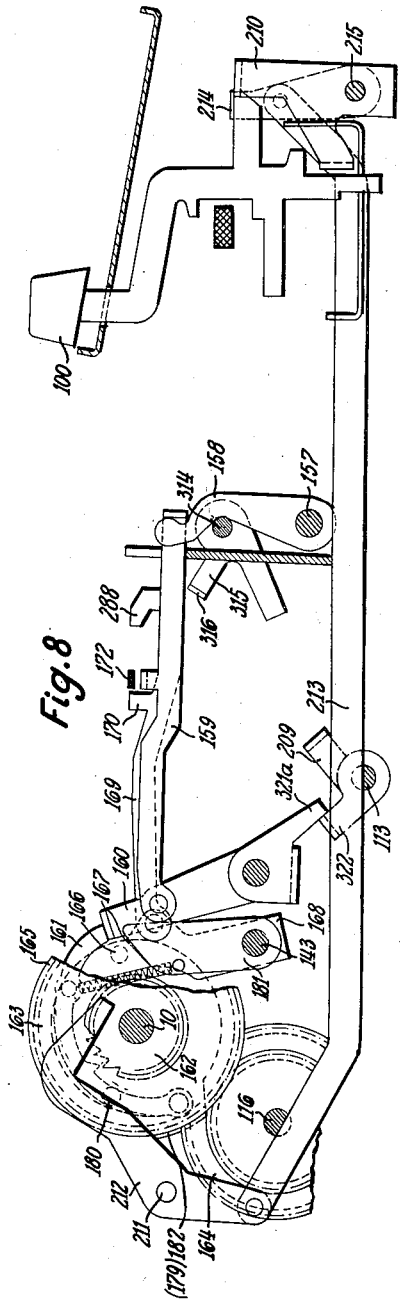
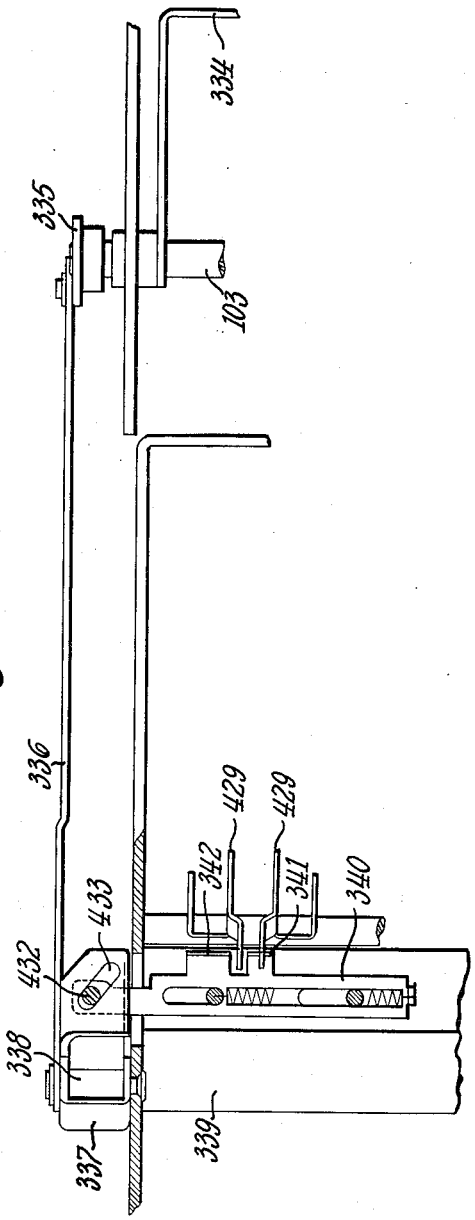
INVENTOR
Ernst Trümpelmann
Karl Westinger
Ernst Altenburger.
BY
Michael S. Striker
ATTORNEY

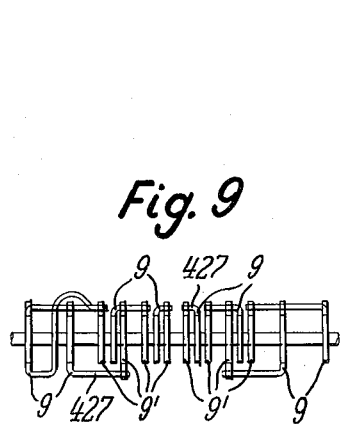
Fig. 9
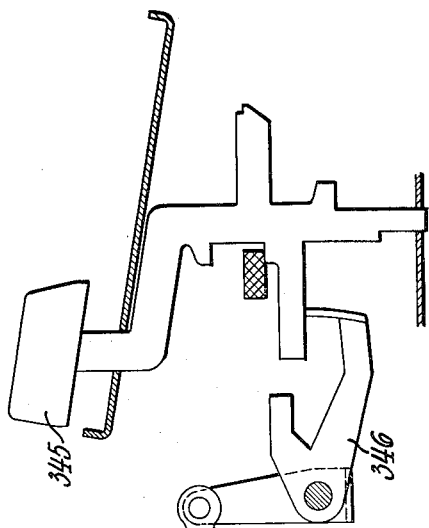
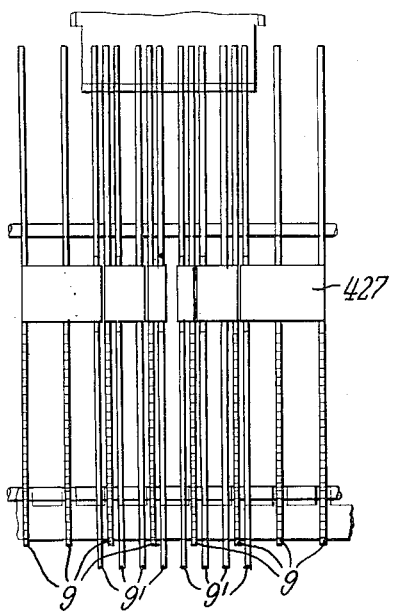
Fig. 10
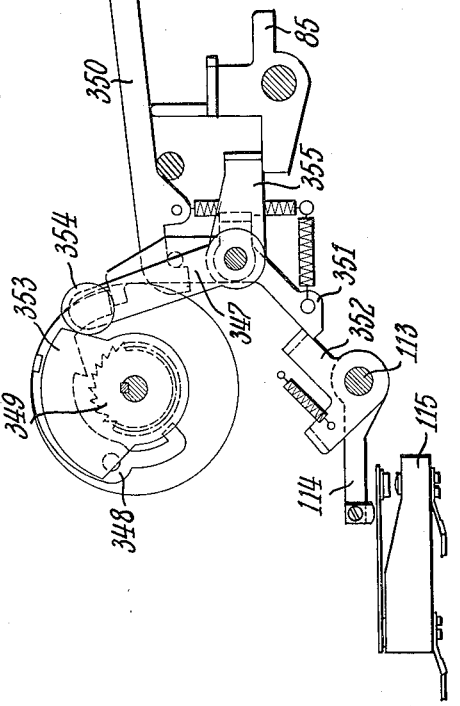
Fig. 11

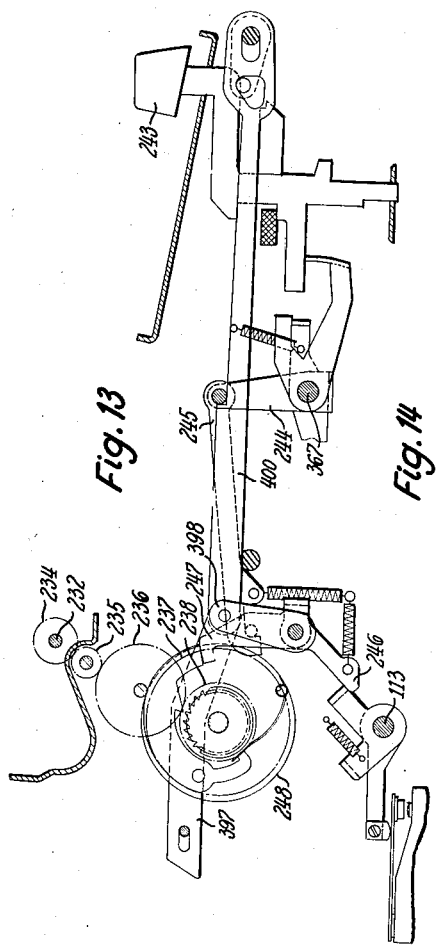
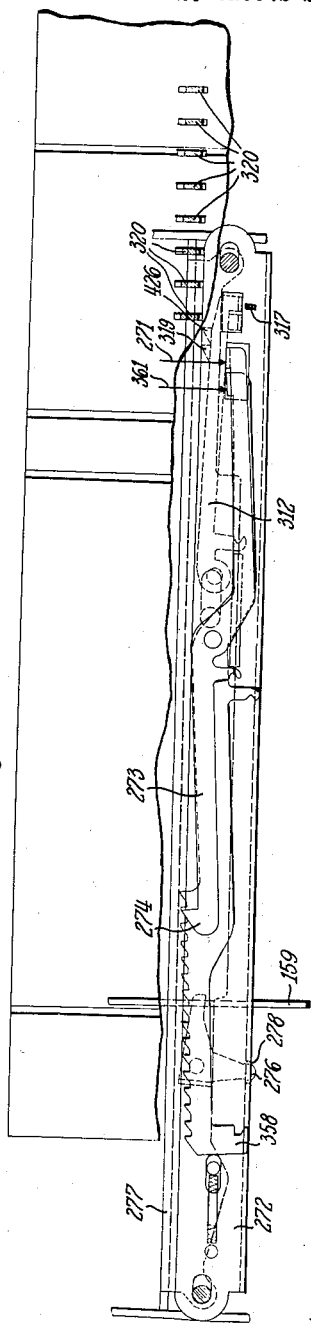

Jan. 7, 1964     E. TRÜMPELMANN ETAL     3,116,874
DIVISION APPARATUS FOR CALCULATORS
Filed July 20, 1959     20 Sheets-Sheet 13
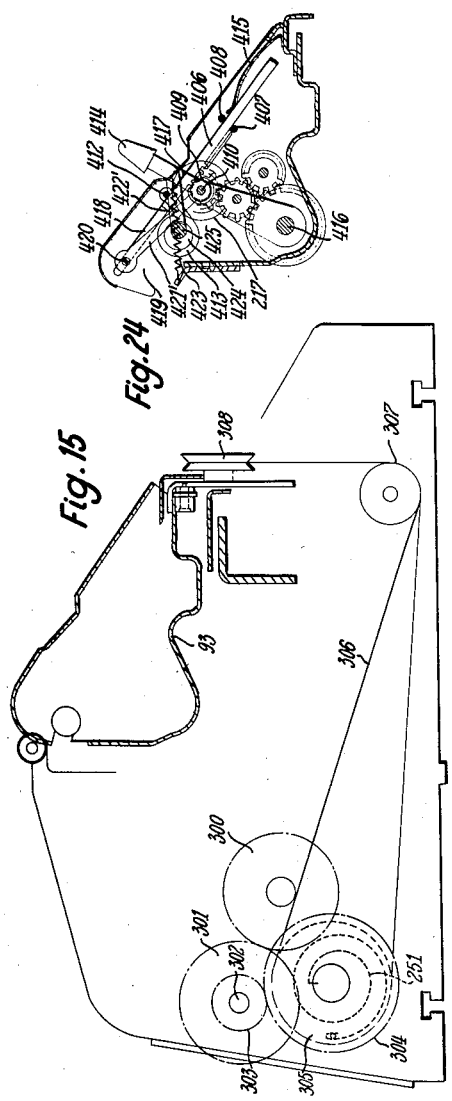
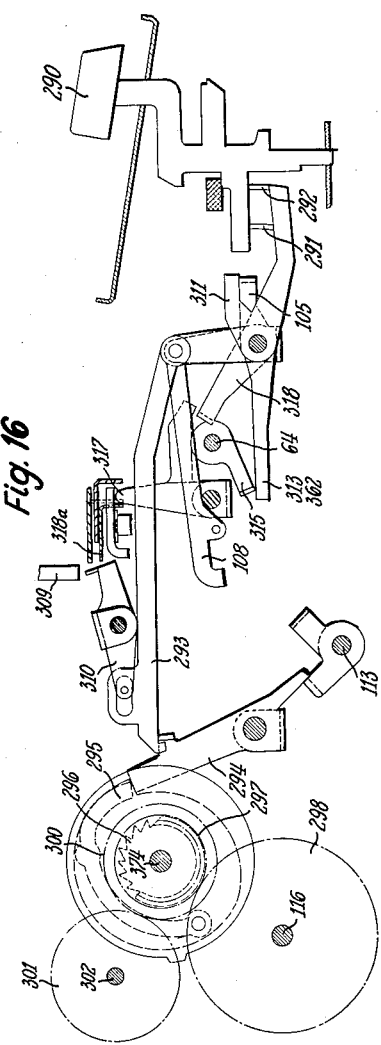
INVENTOR
Ernst Trümpelmann
Karl Westinger
Ernst Altenburger.
BY
Michael S. Striker
ATTORNEY Jan. 7, 1964     E. TRÜMPELMANN ETAL     3,116,874
DIVISION APPARATUS FOR CALCULATORS
Filed July 20, 1959                        20 Sheets-Sheet 14
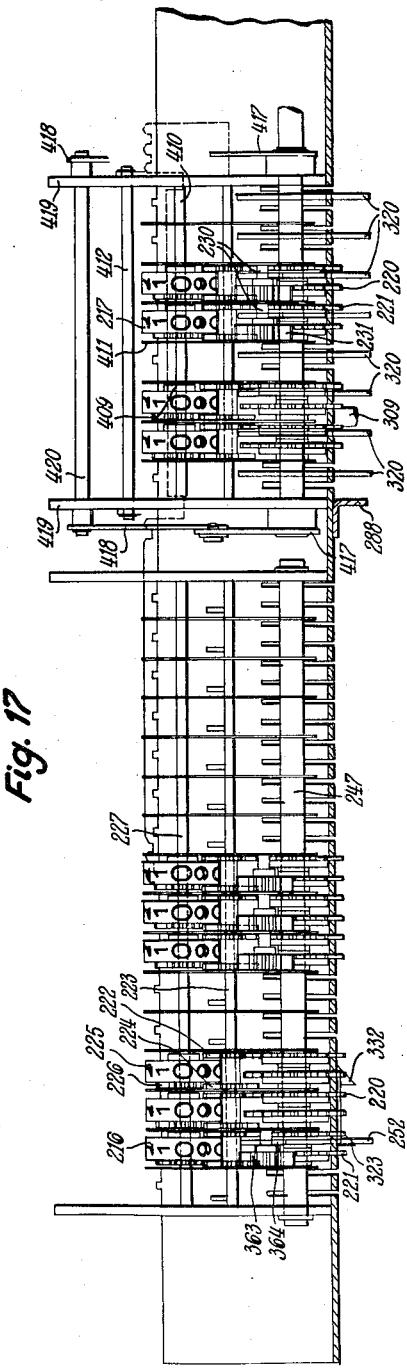
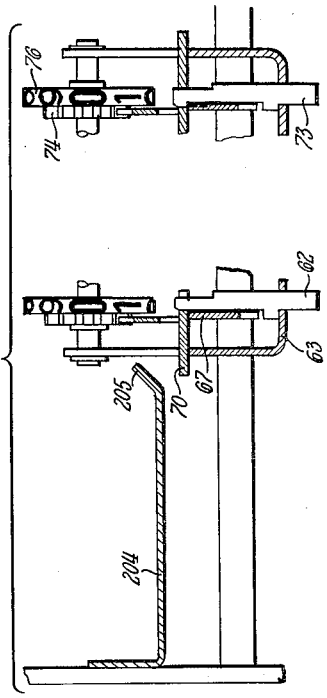
INVENTOR
Ernst Trümpelmann
Karl Westinger
Ernst Altenburger.
BY
*Michael S. Striker*
ATTORNEY Jan. 7, 1964   E. TRÜMPELMANN ETAL   3,116,874
DIVISION APPARATUS FOR CALCULATORS
Filed July 20, 1959   20 Sheets-Sheet 15
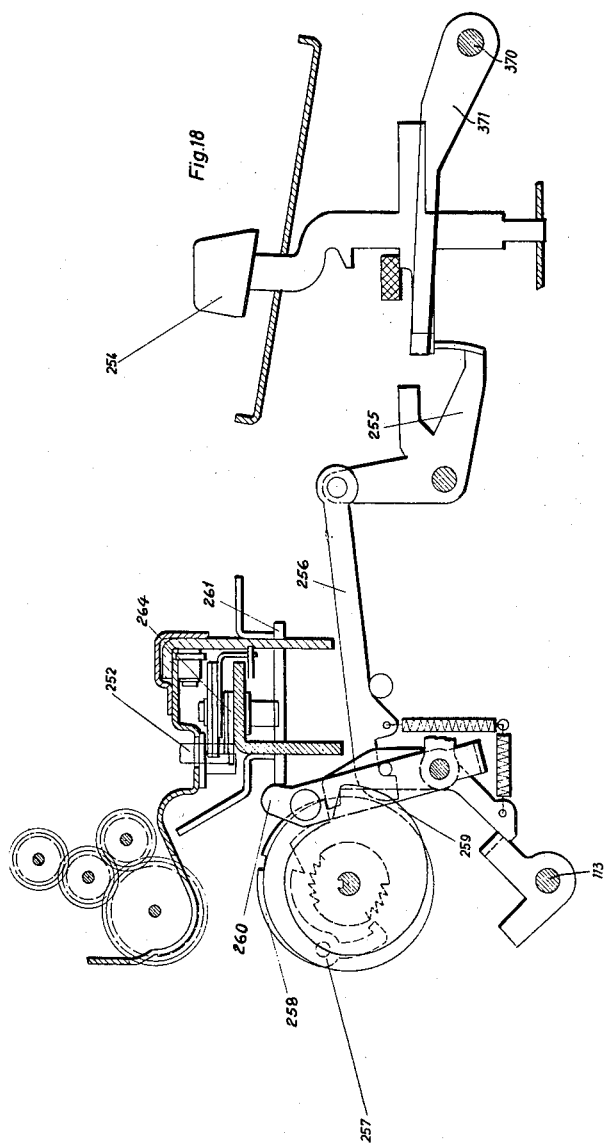
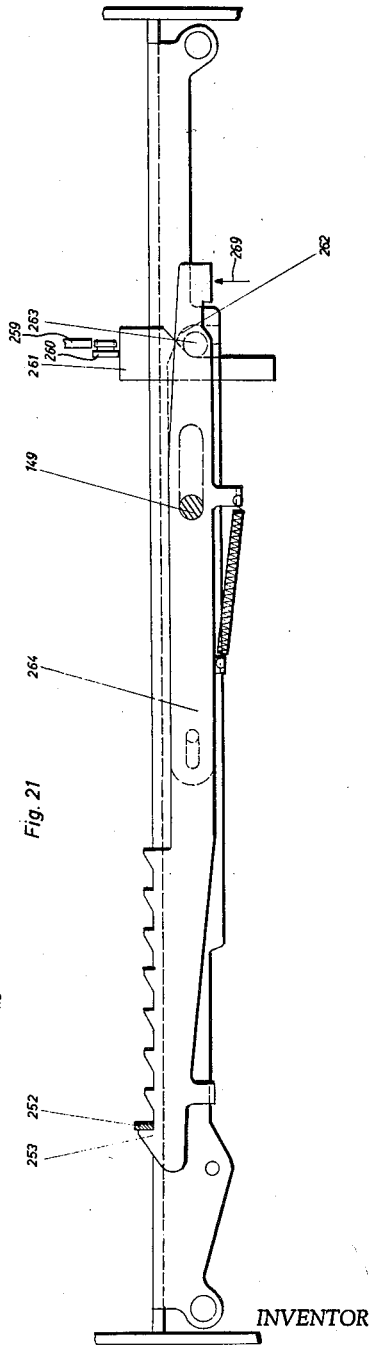
INVENTOR
Ernst Trümpelmann
Karl Westinger
Ernst Altenburger.
BY
Michael S. Striker
ATTORNEY Jan. 7, 1964 E. TRÜMPELMANN ETAL 3,116,874
DIVISION APPARATUS FOR CALCULATORS
Filed July 20, 1959 20 Sheets-Sheet 16
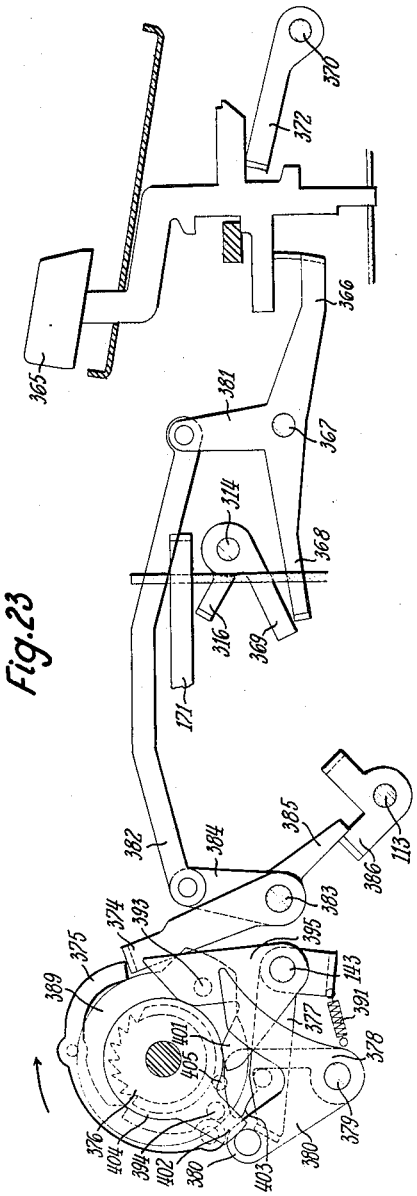
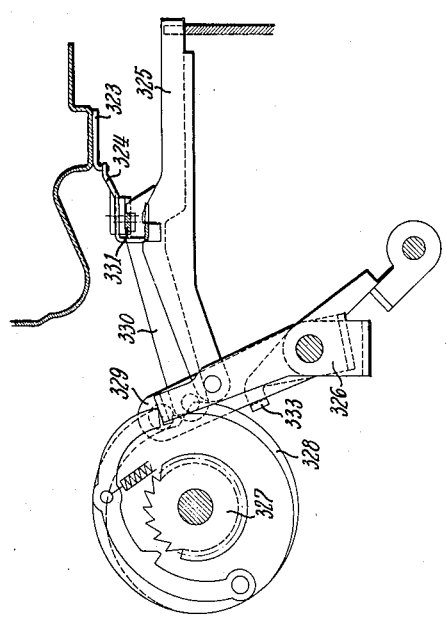
INVENTOR
Ernst Trümpelmann
Karl Westinger
Ernst Altenburger.
BY
Michael S. Striker
ATTORNEY Jan. 7, 1964  E. TRÜMPELMANN ETAL  3,116,874
DIVISION APPARATUS FOR CALCULATORS
Filed July 20, 1959  20 Sheets-Sheet 17

INVENTOR
Ernst Trümpelmann
Karl Westinger
Ernst Altenburger.
BY
  Michael S. Striker
    ATTORNEY Jan. 7, 1964  E. TRÜMPELMANN ETAL  3,116,874
DIVISION APPARATUS FOR CALCULATORS
Filed July 20, 1959  20 Sheets-Sheet 18

BASIC POSITION

Dividend+Divisor

Dividend

Divisor

Dividend

Divisor

INVENTOR
Ernst Trümpelmann
Karl Westinger
Ernst Altenburger.

BY

Richard S. Striker
ATTORNEY

Jan. 7, 1964  E. TRÜMPELMANN ETAL  3,116,874
DIVISION APPARATUS FOR CALCULATORS
Filed July 20, 1959  20 Sheets-Sheet 19

INVENTOR
Ernst Trümpelmann
Karl Weslinger
Ernst Altenburger.

BY

Michael J. Striker
ATTORNEY

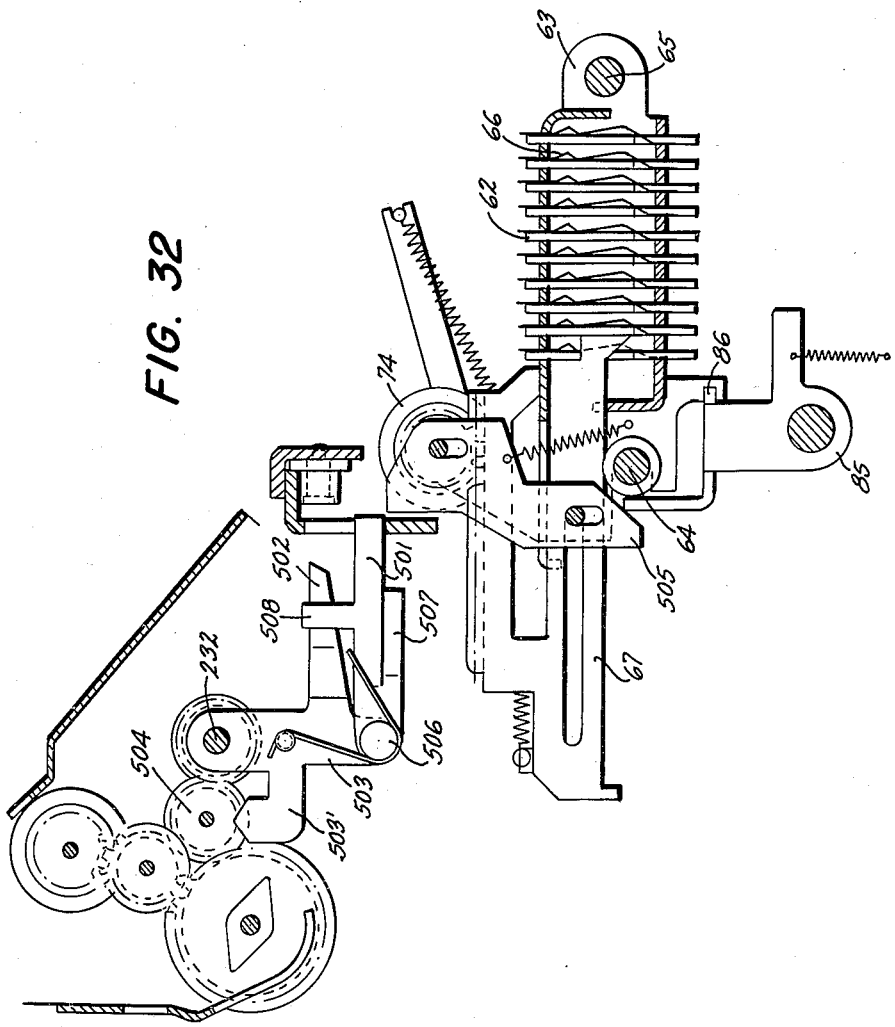

United States Patent Office 3,116,874
Patented Jan. 7, 1964

3,116,874
DIVISION APPARATUS FOR CALCULATORS
Ernst Trümpelmann, Balingen, and Karl Westinger and Ernst Altenburger, Oberndorf (Neckar), Germany, assignors to Olympia Werke A.G., Wilhelmshaven, Germany
Filed July 20, 1959, Ser. No. 828,677
Claims priority, application Germany July 24, 1958
12 Claims. (Cl. 235—63)

INDEX

| | | |
|---|---|---|
| I | Entering Values Into the Setting Mechanism and Into the Storage Mechanism | 6 |
| I.1 | Drive Mechanism for the Pawls | 10 |
| I.2 | Control Mechanism for Lifting and Lowering the Gear Sets of the Storage Mechanism | 10 |
| I.3 | Control Mechanism for Coupling of Gear Sets 11 and 12 | 11 |
| II | Automatic Control of the Parts Which Enter the Entry Values Into the Computing Mechanism | 11 |
| III | Clearance of the Storage Mechanism and Return of the Various Members to the Initial Positions | 14 |
| III.1 | Clearing the Storage Mechanism | 14 |
| III.2 | Return of the Value Entry Rods | 15 |
| III.3 | Return of the Pin Carriage | 15 |
| III.4 | Clearing of a Depressed Function Key | 15 |
| III.5 | Electric Motor Switch Operation | 16 |
| IV | The Computer Carriage | 16 |
| V | Addition | 17 |
| VI | Subtraction | 17 |
| VII | Multiplication | 17 |
| VII.1 | Entry of the Multiplier | 18 |
| VII.2 | Entry of the Multiplicand | 19 |
| VIII | Division | 21 |
| VIII.1 | Entry of the Dividend | 22 |
| VIII.2 | Entry of the Divisor | 22 |
| IX | The Re-Transfer Operation | 24 |
| X | Multiplication by a Constant Factor | 25 |

The present invention relates to a division apparatus for calculators, particularly of the ten-key type having a pin carriage and at least one counter mechanism.

In the four operation calculator disclosed in the co-pending U.S. patent application Ser. No. 765,916 filed September 29, 1958, and described also hereinafter, the dividend is entered during the step of arithmetical division into the calculating mechanism. Thereafter the divisor is entered into the storage mechanism. The divisor is in the storage mechanism repeatedly subtracted from the dividend in the calculating mechanism. The quotient, namely the number of subtractions effected, appears in the counter mechanism.

In order that the quotient will be carried to the maximum number of decimal places, four operation calculators of the prior art require that the dividend be entered such that the first (left) number of the dividend is registered in the furtherest (left) digital space of the calculating mechanism.

In the calculator of the patent application Ser. No. 765,916, pressing the division key to enter the dividend causes the computer carriage to travel completely to the right. This allows the highest (left hand) digit of the calculating mechanism to be brought into engagement with the highest (left hand) digit of the storage mechanism.

Simultaneously the pin carriage moves to the left, so that the highest (left hand) digit of the entry value in the pin carriage is in position to engage the highest (left hand) space of the storage mechanism. In the subsequent operation the entry value in the pin carriage is transferred to the storage mechanism, and from there to the calculating mechanism. The left hand digit of the entry value therefore coincides with the left hand digital space of the calculating mechanism. The computer carriage remains in its extreme right position. After entry of the divisor, a second function key is pressed. This allows the pin carriage to move to the left, so that the left hand digit of the entry value again can engage with the left hand digital space of the storage mechanism. Since the computer carriage is still in its extreme right position, the left hand digital space of the calculating mechanism is also in the same engagement position.

An object of the present invention is to provide two keys to be used to enter the divisor into the storage mechanism. These keys can be selectively actuated. The first function key allows the pin carriage to complete its passing motion before the operational sequence for division is commenced. The second function key, upon depression, actuates commencement of the division operation, without first requiring the pin carriage to execute its leftward travel. Therefore, when the last mentioned key is depressed, the left hand (highest) digit of the entry value is not transferred to the left hand (highest) digital space of the storage mechanism. Further, since the computer carriage is at the extreme right of its travel, the left hand (highest) digit of the entry value is not subtracted during the division operation from the value in the left hand (highest) digital space of the calculating mechanism. Instead, the (lowest) right hand digit of the entry value is transferred to the (lowest) right hand digital space of the storage mechanism. Since the computer carriage is at the extreme right, this right hand digital space of the storage mechanism is in an engagement position with a digital space in the middle region of the calculating mechanism. If the divisor would appear in this position of the calculating mechanism, its (lowest) right hand digit would be a certain distance from the right hand edge of the calculating mechanism, namely that distance which would correspond to the distance that the computer carriage has traveled relative to the calculating mechanism. Insofar as the number of digits of the divisor is smaller than the capacity of the calculating mechanism, there would remain a few digital spaces empty between the highest digit of the divisor and the left margin of the calculating mechanism.

Thus another object of the invention is to make it possible that the divisor engages the calculating mechanism in its central region in such a manner that a few digits remain empty between its lowest digital space and the right margin of the calculating mechanism.

Still another object of the invention is to provide a calculator permitting to directly divide the result of a division or multiplication, or the total obtained by an addition or subtraction, or the total of two results of multiplications by a dividend entered while the result of the preceding calculation remains stored in the machine, and is not cleared and re-introduced.

This may be mathematically expressed by the following equations:

$$\frac{a.b}{z} \quad \frac{a \pm b \pm c}{z} \quad \frac{a.b \pm c.d}{z}$$

wherein $a$, $b$, $c$, $d$ are numbers multiplied, added or subtracted to result in a dividend remaining stored in the machine and being directly divided by a divisor $z$.

For example:

$$\frac{2.3 + 3.4}{9} = \frac{6 + 12}{9} = \frac{18}{9} = 2$$

In the following, in particular, solutions of the first mentioned equations are discussed. However, the same applies equally to the later equations. During this mixed division the individual numerals of the dividend are added or multiplied in the right hand margin of the calculating mechanism the same as in conventional addition and subtraction. The spaces between the highest decade of the dividend and the highest decade of the calculating mechanism, which remain empty, serve as reserve positions, available for possible additions or multiplications.

Normally the dividend does not fill the full capacity of the calculating mechanism; therefore its highest digit is not in the left margin of the calculating mechanism. When in such a case the divisor would be entered into the storage mechanism by conventional means in such a manner that its highest digit would stand in the highest digit of the storage mechanism there would appear in the counter mechanism during the divisional operation a plurality of zeros until during calculation the highest digit of the divisor would appear under the highest digit of the dividend in the calculating mechanism. At such a time however the capacity of the counter mechanism for digital positions may be almost exhausted so that only a small number of digital positions of the quotient remain available. When however upon the entry of the divisor the above mentioned second key is depressed, the digits which contain the divisor in the storage mechanism come into engagement with the central digits of the calculating mechanism. Thus during summing up only a few empty digits appear in the counter mechanism. The advantage of this method of calculation is particularly apparent when the dividend has a relatively high digital number and when the digital number of the divisor is not less than the number of digits at which the dividend is larger than the capacity of the storage mechanism since conventionally during the movement of the counter carriage to the right the calculating mechanism is moved to the right a distance equal to the total capacity of the storage mechanism. In accordance with apparatus of the invention, preferably the capacity of the storage mechanism comprises eight digits and upon movement of the counter carriage to the right the lowest digit of the storage mechanism engages the eight digits of the calculating mechanism.

Thus in accordance with the embodiment of the invention hereinabove described the divisor may be entered selectively either in the conventional manner into a digital position adjoining the left margin of the mechanism or into a position adjacent to the right margin of the storage mechanism. If the dividend is adjoining the left margin of the calculating mechanism, the divisor also must be entered adjacent to the left hand margin of the storage mechanism. If the dividend, however, is in the right margin of the calculating mechanism, since it is the result of previous additions, subtractions, or multiplications, the result of which is to be divided by the divisor, the divisor is entered then in such a case in the lowest orders of the storage mechanism, without the pin carriage passing to the left. Thereafter, when the computer carriage has passed to the extreme right for purposes of division, the divisor is entered in the central region of the calculating mechanism. Thus, a relatively high digital number is achieved in the counter mechanism.

Thus the depression of the above-mentioned second key is only then not useful, when the digital number of the dividend which exceeds the digital number of the storage mechanism, is greater than the digital number of the divisor. The calculator of the application Ser. No. 765,916 has in the storage mechanism a capacity of eight digital numbers and the counter carriage at the beginning of the divisional operation is moved so far to the right that the lowest digital number of the storage mechanism is in engagement position with the eighth digit of the calculating mechanism. The above mentioned calculating operation therefore is not useful any more when the dividend, for instance, has twelve positions while the divisor has only three, two, or one position.

Hereinabove situations were discussed in which either the dividend during conventional division is situated on the left margin of the calculating mechanism, or by utilizing the possibility of the present invention's engaging the divisor when the dividend is in the right margin of the calculating mechanism. It may be, however, also useful not to enter the dividend adjacent to the right or left margin of the calculating mechanism, but in the middle region thereof instead; that is, in the region in which the divisor is entered by depression of the above mentioned second key. In an embodiment of this invention therefore the calculator has a tabulator-key, which moves the computer carriage so far to the right as it is moved automatically during the entering of the divisor in the center region of the calculating mechanism. An advantage of this embodiment is that it is possible to perform the four operations upon the movement of the computer carriage to its right end position in the central region of the calculating mechanism. This may be done the same as if these operations were performed on the right margin of the calculating mechanism as long as there is a sufficient number of higher orders. If however, according to this embodiment a divisor is entered which has the same or a greater number of orders than the dividend, the capacity of the counter mechanism is substantially better utilized. In order to bring the highest digit of the divisor under the highest digit of the dividend and to make the digital sums appear thereby in the counter mechanism, only a few apparatus operations are required. Compared with the calculating method by which the dividend is entered in the right margin of the calculating mechanism and the divisor in the central region of the calculating mechanism, while simultaneously mixed divisions are carried out, the entry of the dividend in the central region of the calculating mechanism permits utilization of the capacity of the counter mechanism to a greater advantage.

In the following now a further development is discussed which permits even a better utilization of the capacity of the counter mechanism to its fullest extent. It is hereby assumed that the number of orders of the dividend is greater than the number of orders of the divisor. In the explanation of the embodiments discussed above, it becomes clear that consecutive addition and division may be carried out only when the dividend is entered adjacent to the right margin of the calculating mechanism or in the center thereof. In both instances when the order number of the dividend is greater than that of the divisor, the capacity of the counter mechanism is not particularly well utilized, and a greater order number of the quotient is desirable. In order to utilize fully the capacity of the counter mechanism when the order number of the dividend is greater than that of the divisor, without giving up the possibility of carrying out divisions in which the dividend is the result of additions or subtractions, in accordance with the invention the dividend is entered in the central region of the calculating mechanism, and the divisor is entered in the storage mechanism in such a manner that its highest order is placed at the highest order of the dividend. This in accordance with the invention is accomplished by letting the pin carriage pass to the left until the highest order of the divisor entered in the pin carriage is positioned for cooperation with the highest order of the dividend in the calculating mechanism. In an embodiment of the invention this is simply accomplished by causing the pin carriage to sense, upon movement of the counter carriage to its upmost right position, parts which are controlled by the highest occupied orders of the calculator mechanism.

As an example of such means, a stop in the path of the pin carriage stop may be actuated by the calculating mechanism to block movement of the pin carriage.

Additional objects of the invention will become apparent from the following description of an embodiment of the invention. The various features may be employed in different embodiments of the invention independently or jointly.

FIGURE 4 is a sectional view of the addition and gear set clutch-drive and their connection with the addition and multiplication keys.

FIGURE 7 is a view of the coupler and uncoupler of the two gears of a gear set.

FIGURE 8 is a view of the mechanism of the main drive clutch.

FIGURE 9 is a view of the value entry rods, showing their different forms and spacings.

FIGURE 10 is a plan view of the parts of the mechanism shown in FIGURE 9.

FIGURE 11 is a view of the division clutch and its connection with the division key.

FIGURE 12 is a view of a mechanism for disengagement of the counter carriage.

FIGURE 13 is a view of the calculating mechanism clutch and associated members.

FIGURE 14 is a view of the control guide with the entry- and multiplication-hooks and of the division guide.

FIGURE 15 is a view of the mechanism for the computer carriage drive.

FIGURE 16 is a view of the carriage return clutch together with the actuating mechanism for the multiplication key.

FIGURE 17 is a plan view of the computer carriage.

FIGURE 18 is a view of the subtraction assembly.

FIGURE 19 is a cross-sectional view of the pin carriage together with the setting mechanism.

FIGURE 20 is a plan view of the parts shown in FIGURE 19.

FIGURE 21 is a view of the computer carriage ratchet with a part of the subtraction mechanism.

FIGURE 22 is a view of a mechanism for disengaging the apparatus to its original position upon completion of the calculating operation.

FIGURE 23 is a view of the return drive clutch and associated mechanism.

FIGURE 24 is a view of the accumulator mechanism on the counter carriage for re-entry of a constant factor.

FIGURE 25a to p inclusive are schematic diagrams of several positions of the storage mechanism.

Figure 26:
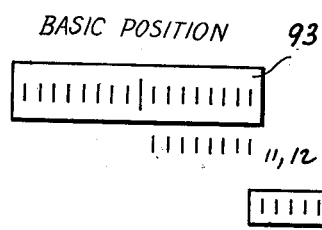

FIGURE 26 is a schematic diagram of the position of the computer carriage, calculating mechanism, storage mechanism and pin carriage upon depression of the division key for entry of the dividend.

Figure 27:
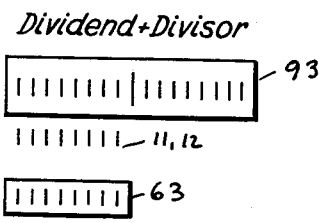

FIGURE 27 is a schematic presentation of the continuation position of the pin carriage into position engaging the left margin of the storage mechanism.

Figure 28A:
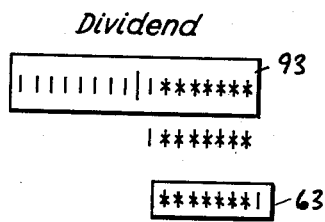
Figure 28B:
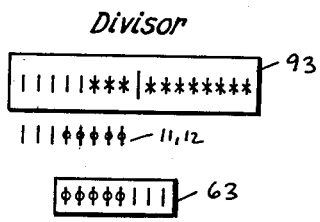

FIGURE 28a and 28b are schematic presentations of positioning individual numerals of the dividend during mixed division.

Figure 29A:
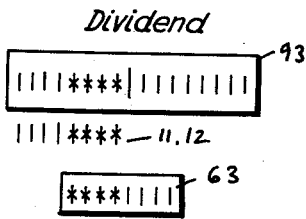
Figure 29B:
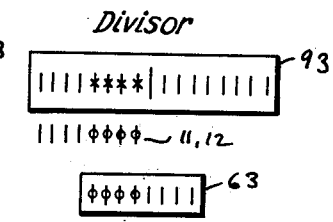

FIGURES 29a and 29b are schematic presentations similar to those of FIGURES 28a and 28b.

Figures 2, 2A:
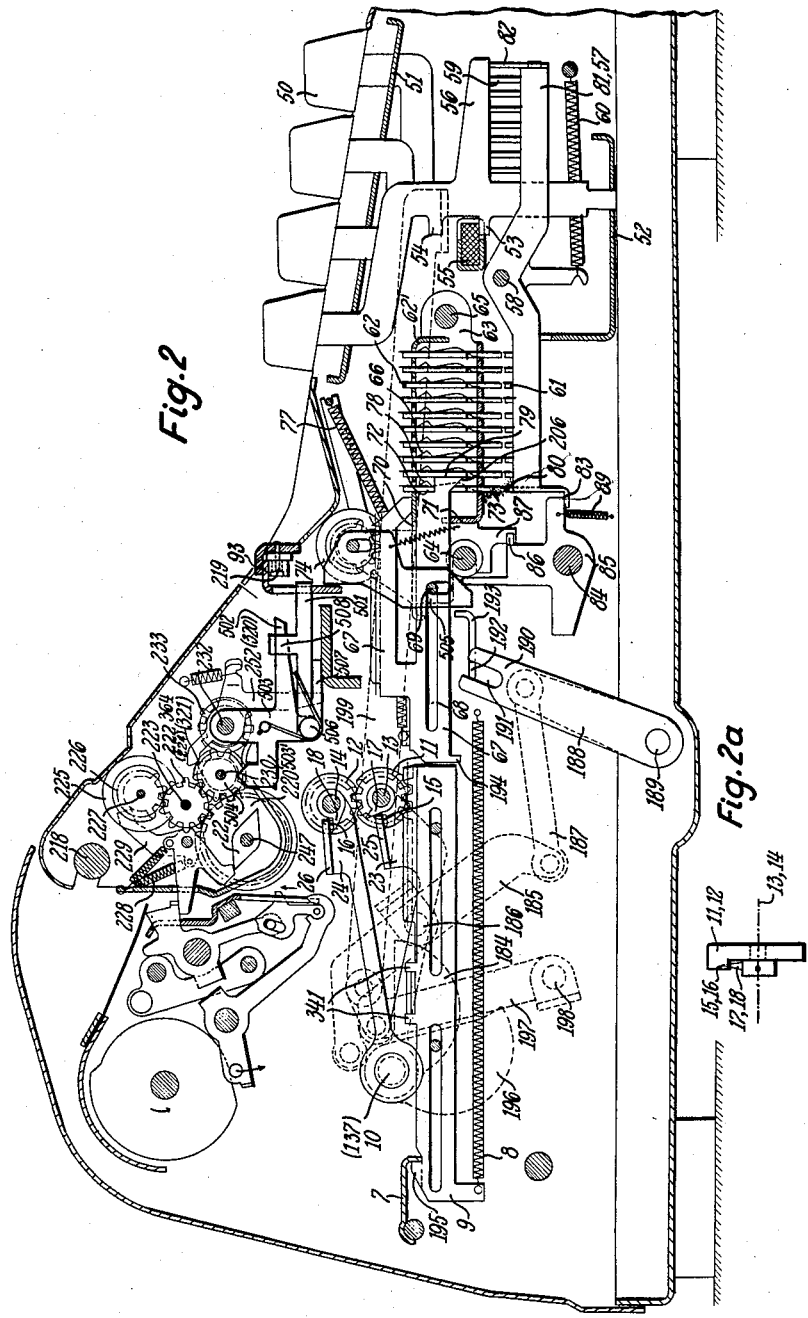
FIGURE 2 is a side assembly view in cross-section of the calculator.
FIGURE 2a is a plan view of a gear and gear projection of a gear set in the storage mechanism shown in FIGURE 2.
Figure 30:
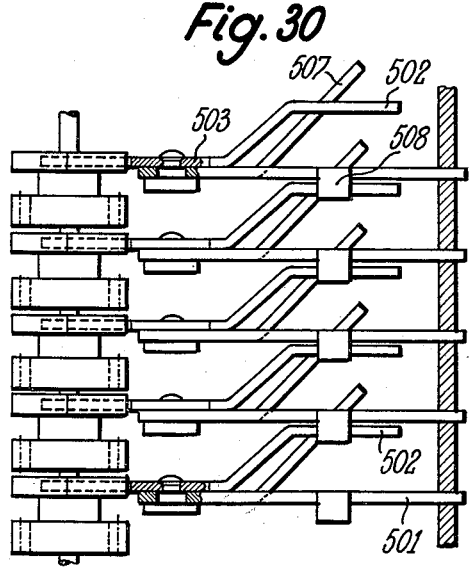

FIGURE 30 is a fragmentary plan view of a part of the structure shown in FIGURE 2.

Figure 31:
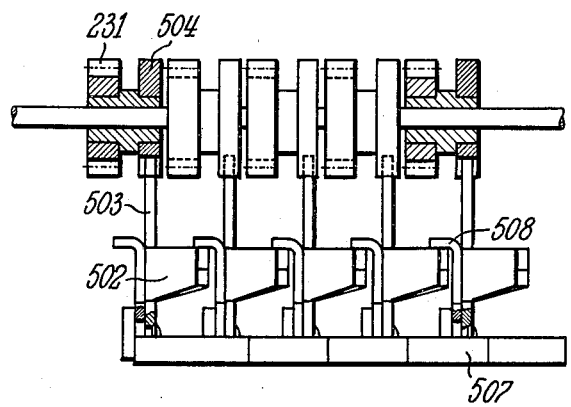

FIGURE 31 is a front view of the structure shown in FIGURE 30.

FIG. 32 is a side view showing the carriage detenting mechanism of the invention.

With the above and other objects in view, as will hereinafter more fully appear, reference is now made to the following description taken in connection with the accompanying drawings.

Figure 1:
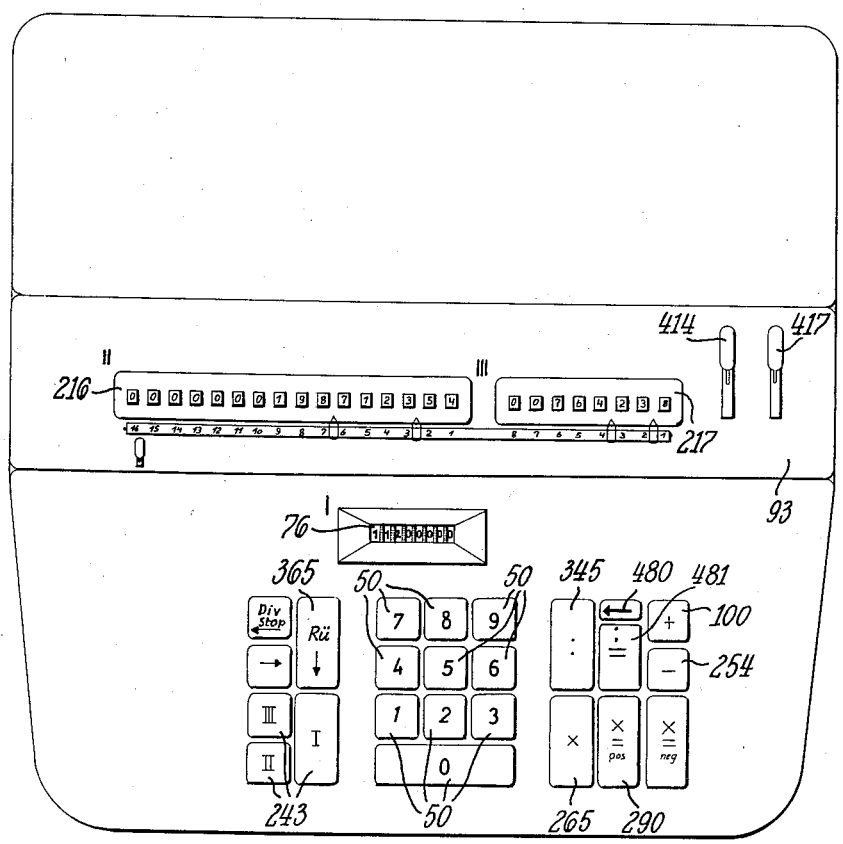
FIGURE 1 is a plan view of the calculator of the parent invention with the cover in place.

The 10 key board of the parent application is shown in the center of FIGURE 1 as a conventional key-board. On the right hand side are positioned function keys, the multiplication "×" key, 265, which serves the multiplication; the "×=pos" key which serves to add the multiplication result to a number appearing on the indicator of the calculating mechanism 216; the multiplication negative key "×=neg" which serves to subtract the multiplication result from a number appearing on the indicator of the calculating mechanism; the conventional addition and subtraction keys 100 and 254 resp.; the first division key ":" (345) which serves the purpose of setting the various operating mechanisms to the proper position to begin a division calculation; the second division key ":=" (481) which serves to initiate the division calculation after the divisor and the dividend have been entered into the machine.

Above the ten-key board is a register window marked also I which records the number which was keyed in on entry numeral disks 76. Above the register window is the computer carriage 93 having a left hand portion, marked II, which is the plan view of the calculating mechanism and having a right hand portion, marked III, which is the counter mechanism 217. Underneath of the two sections are manually operable decimal markers. The levers 414 and 417, shown in the upper right hand corner are levers to control multiplication by constant factor.

On the left hand side of the ten-key board are keys 243 marked I, II, and III which serve to clear the numerical values appearing in the corresponding windows I, II and III, respectively, mentioned above.

The left and right arrow keys move the computer carriage to the right or left any desired amount for the purpose of limiting the number of digital positions in which the calculation is performed to that required by the number of significant digits desired in exactitude of the answer desired.

The key marked RU with a downward pointing arrow is the transfer key 365, which serves to transfer a value appearing in the computer carriage into the gear sets 11 and 12 for future use.

In FIGURES 2 and 3 are shown the principal parts of the calculator. The computer carriage 93 with its associated parts appears at the top of FIGURE 2.

Figure 3B:
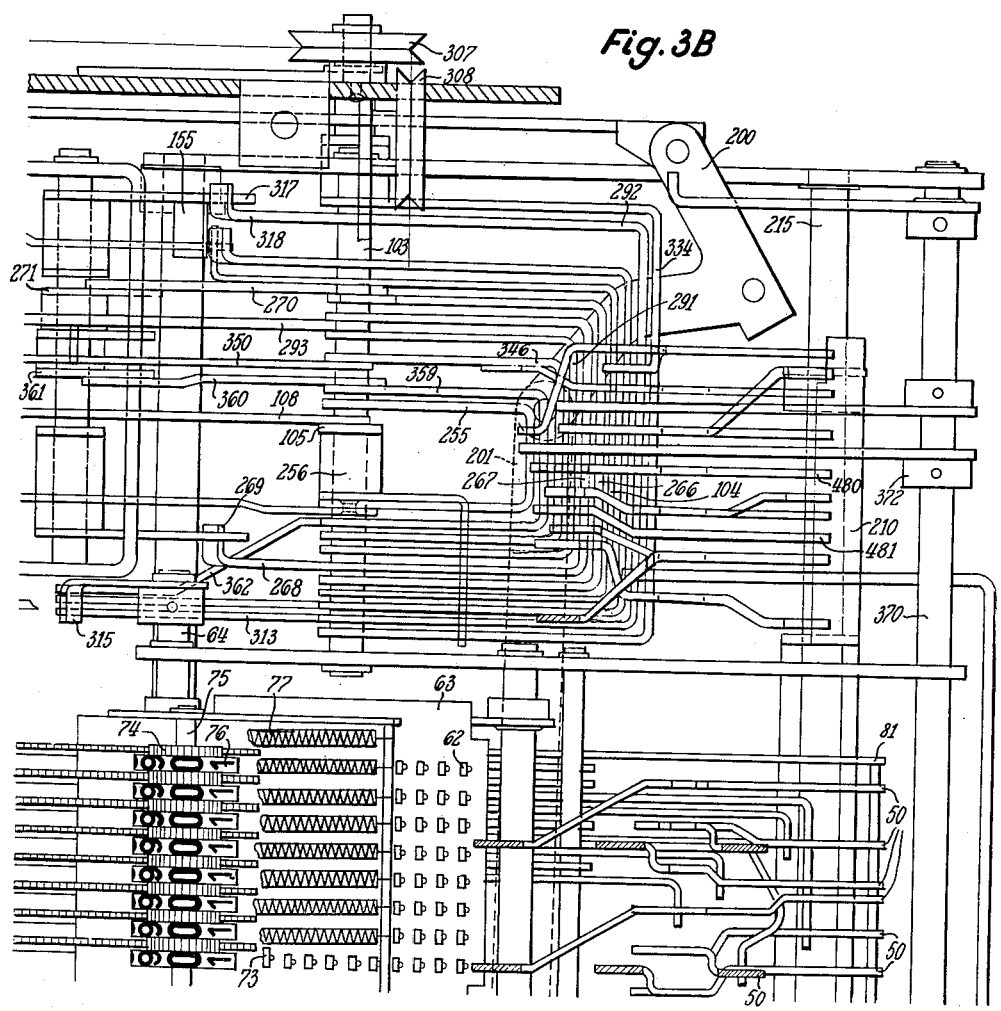
FIGURE 3 is a plan view of the entire assembly of the calculator and is composed of four portions FIG. 3A, FIG. 3B, FIG. 3C and FIG. 3D.
Figure 3C:
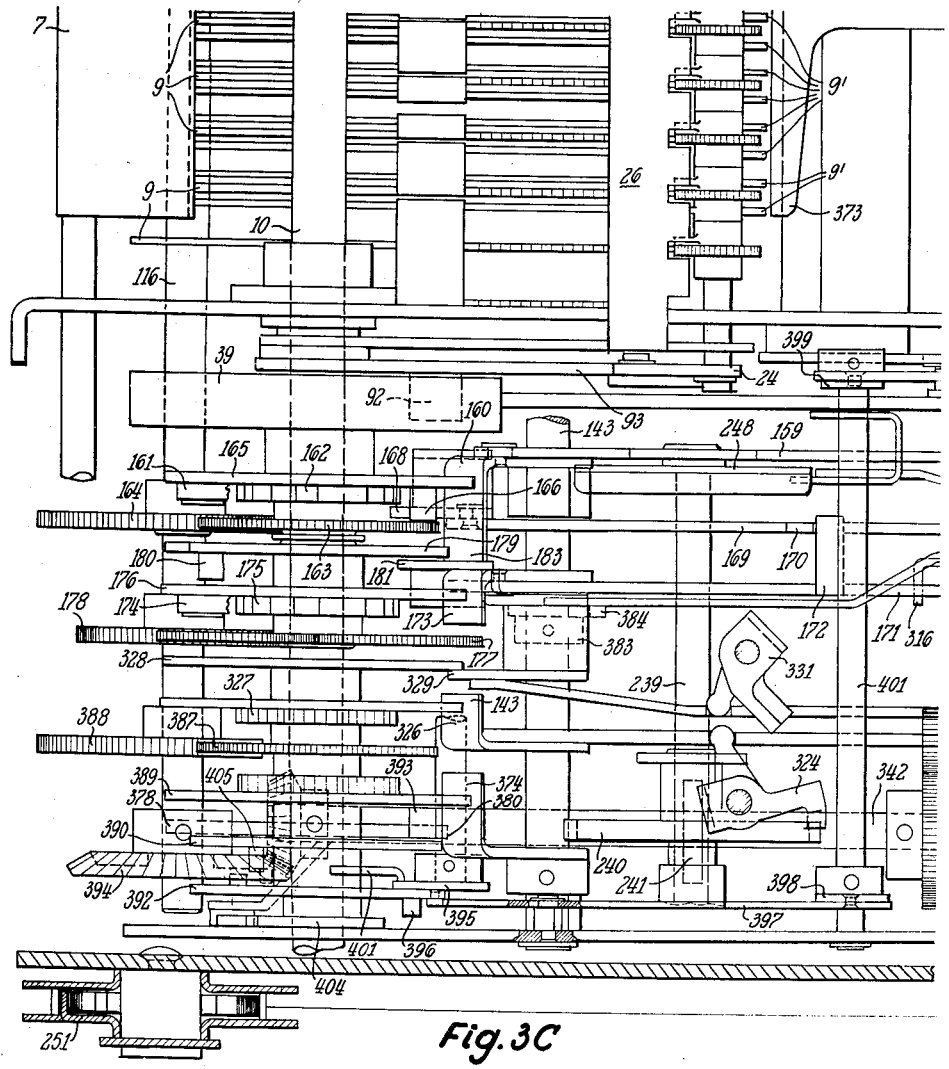
Figure 3D:
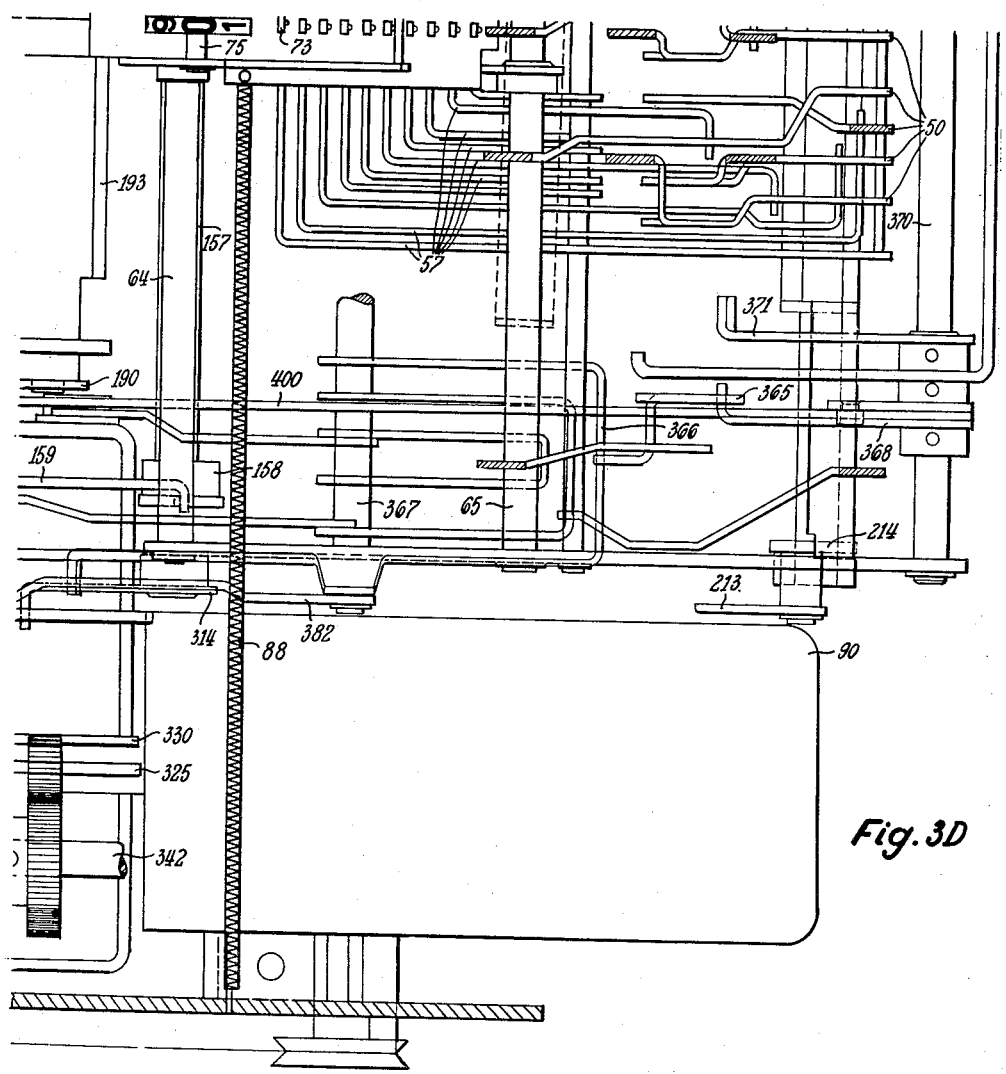

At the right hand side of FIGURE 2 and in FIGURES 3B and 3D is shown the key board region with its associated parts. To the left of the key board in FIGURES 2 and 3B and 3D is shown the pin carriage 63.

To the left of the pin carriage in FIGURE 2 and in FIGURES 3A and 3C is shown the storage mechanism with its gear sets 11 and 12 and other associated parts.

In FIGURE 2 underneath the storage mechanism are the value entry rods 9 and between the value entry rods and the pin carriage are the setting pin gear racks 67.

In FIGURE 3D appears the main drive motor 90.

The various clutch mechanisms are generally shown in FIGURES 3A and 3C.

The details of the above figures and the other figures of the drawings of this application are discussed in greater detail as follows.

I.—ENTERING VALUES INTO THE SETTING MECHANISM AND INTO THE STORAGE MECHANISM

By depression of number keys 59, setting pins 62 are guided upward into the pin carriage. Spring loaded gear racks 67 are contacted by the pins. The motion is transmitted through the teeth of the gear racks to the number wheels of the pin carriage. The positions of the racks 67 are sensed by value entry rods 9, whose teeth in turn position the lower gears of the gear pairs 11, 12. The lower gears 11, in which the entry number is entered, are then lifted from the value entry rods 9 and brought into engagement with the upper gears 12 of the storage mechanism. The latter in turn are brought into engagement with one of the portions of the computer carriage. The value set up in the lower gears 11 of the storage mechanism is thereupon transferred through the upper gears 12 of the storage mechanism to the computer carriage by simultaneously restoring the lower gears to their starting position. The entry value is now set up not only in the computer carriage, but also in the upper gears 12 of the storage mechanism.

Next, the engagement of the computer carriage with the gears 11 and 12 is broken. The upper gears 12, which still hold the originally selected entry value, are returned to their starting position, thereby re-transferring that value again to the lower gears 11, with which they are still in engagement. Thus the upper gears 12 store an entry value simultaneously with the transfer of the value to the computer carriage. As soon as the connection with the computer carriage is broken, this value again is transferred immediately from the upepr gears 12 to the lower gears 11. This is particularly important in the multiplication operation, which in this type of calculator is carried out by effecting a series of additions corresponding to the numerical value of the multiplier. The number is then immediately and continuously available in the storage mechanism for repetitive entry into the computer carriage, that is, for repetitive addition. When it is not necessary to keep the entry value available (for example, in the case of a simple addition of two numbers) the entry value will be cleared by a separate operation.

The number keys 50 run vertically in a key housing 51 and traverse 52. The keys have two buffer tangs 53 and 54, between which is a buffer 55 of sound-damping material. Each number key also carries an extension 56, mounted to engage one of the rocker arm projections 59. As shown in FIGURES 2 and 3 each projection 59 is mounted on a double setting pin rocker arm 57, the rocker arms 57 being pivoted about suitable bearings on a common shaft 58. Each extension 56 also operates on a projection 82 on a shift pin rocker arm 81 mounted parallel to rocker arm 57. Rocker arm 81 also pivots on a bearing on shaft 58. Each rocker arm 57 and 81 is kept in neutral position by a spring 60. On the ends of the rocker arms 57 which are away from extensions 56 are nibs 61. On depression of a number key the appropriate nib pushes against the bottom of one of the setting pins 62 of a pin carriage 63. Each rocker arm 81 has a nib 80, which engages a shift pin 73. The shift pins 73 are arranged in front of setting pins 62 and in the same manner as the latter in the pin carriage 63. The pin carriage 63 is mounted on two cross-shafts 64 and 65. The pin carriage has several rows of setting pins 62, the number of rows corresponding to the capacity of the setting mechanism for numbers 0 to 8. A fixed stop bar 62' is provided for digit 9.

Each setting pin 62 has a catch spring 66, so shaped that the setting pin is held in the pin carriage 63 in either the upper position or the lower position. The number of racks 67 corresponds to the number of positions in the set up mechanism and to the number of rows of setting pins. These racks are arranged side by side in the pin carriage. The racks 67 have slots 68 in which rides the guide rod 69 of pin carriage 63. The racks 67 also have U-shaped extensions on top, (see FIG. 2) which slide along the upper guide plate 70. These racks are further guided by slots 71 cut in the pin carriage 63. As shown in FIGURES 3 and 19, the racks 67 engage gears 74, mounted on a common shaft 75 in the pin carriage. To these gears 74 are attached numeral disks 76, the surfaces of which carry numerals from 0 through 9. These numerals are visible to the operator through a slot in the case, thus enabling direct reading of entry values. As shown in FIGURE 2, racks 67 are drawn by springs 77 against the setting pins 62. When in a neutral position, the racks rest with surface 72 against the front shift pins 73. These shift-pins, in an arrangement similar to that of the setting pins, have a spring 78 for holding the pins in either the upper or lower position.

When an entry value digit is selected by depressing one of the number keys 50, the shift pin 73 is pushed upward, thereby releasing the setting pin gear rack 67.

Spring 77 draws the rack forward towards the setting pin 62 until its lower striking surface 79 contacts the selected setting pin.

As shown in FIGURES 2 and 20, on the end of rocker arm 81 which is away from number key extension 56 (i.e., towards the rear of the calculator) an extension hook 83 is mounted, which engages an arm of shift ratchet 85. The shift ratchet is mounted so as to rotate about shaft 84. The ratchet teeth 86, on the side towards the pin carriage 63, engage with the shift extension 87 of the pin carriage. As shown in FIGURES 3 and 20, to the pin carriage is fastened a spring 88 which tends to move the pin carriage axially along the shafts 64 and 65, bringing the pin carriage shift extension into contact with one of the teeth 86 of the shift ratchet 85.

Depressing a number key 50 rotates the corresponding setting pin rocker arm 57 and shift pin rocker arm 81. This in turn actuates the appropriate setting pin 62 of the row which, corresponding to the position of the pin carriage, is positioned over the rocker arm nib 61. Setting pin 62 is lifted into the path of the rack 67 involved. The shift pin rocker arm nib 80 simultaneously lifts the shifting pin 73 and thus releases the setting pin gear rack 67. The rocker arm hook 83 simultaneously lifts the engaged shift ratchet tooth 86 out of the path of the pin carraige shift extension 87 by rotating the shift ratchet 85, so that the pin carriage (under the tension of spring 88) jumps a short distance.

This movement is terminated by impact of shift pin 73 of the next row on the shift pin rocker arm nib 80.

A new entry value digit may now be selected. The nib 80 thus serves to limit the advance of the pin carriage as well as to actuate the shift pins 73. The touch-selection of entry value digits occurs in the manner conventional to ten key apparatus, by selection of the highest number first, followed by the successive digits of the entry value number.

Thus the position of the setting pin gear racks 67 corresponds to the selected entry value as it appears in the setting mechanism. This position of the racks 67 is transferred to the storage mechanism through the value entry rods 9, which are held against the rear end of racks 67 by the value entry rod springs 8. The distance between the several orders in the setting mechanism being smaller than that in the storage mechanism, an auxiliary value entry rod 9' is associated with each value entry rod 9. As shown in FIGURES 9 and 10, each pair of rods is connected by bow-type connectors 427. The transverse spacing of the auxiliary rods 9' corresponds exactly with the spacing of the setting pin gear racks 67. Contrary to the prior art method of accomplishing the transition from one spacing to another by bell cranks, this side by side arrangement of value entry rods 9, each connected with an auxiliary rod 9', has the advantage of substantially decreasing the space required.

Figure 25:
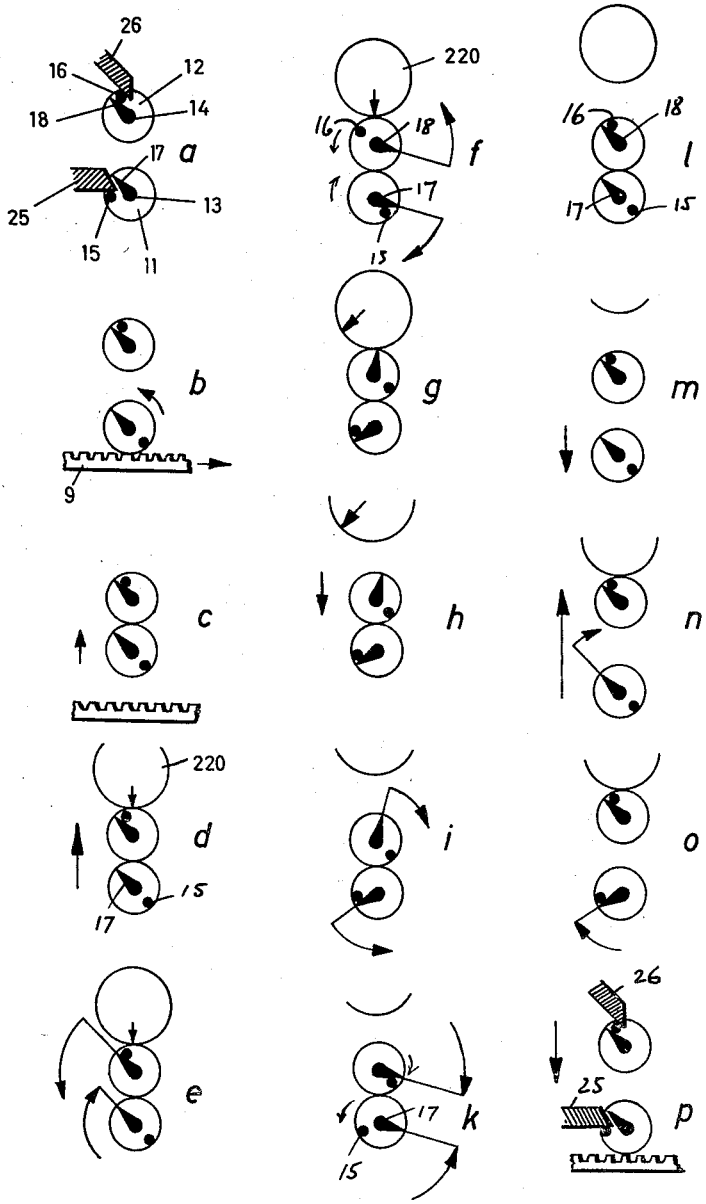

Each auxiliary rod 9' carries at its rear end a tang 195. Over these tangs 195 rides the hooked front portion of a stop plate 7, which is mounted pivotally and which holds the rods 9 and 9' in the rest position. When the stop plate is lifted, the rods 9 and 9' move forward under the tension of spring 8 until the front ends of the auxiliary rods 9' contact the rear end of the gear racks 67. This motion is transferred by the teeth of the gear rack on value entry rod 9 to the lower gears 11 of the storage mechanism. Thus the entry value is transferred to the gears 11. In addition to the eleven-tooth lower gear set 11 the storage mechanism has an upper gear set 12, which functions as a storage device. This upper gear set may be brought into engagement with the lower gear set 11. The individual gears of these gear sets turn freely on shafts 13 and 14 respectively. As shown in FIGURES 2 and 25, each gear has a lateral projection 15 and 16 respectively in its side at the height of a tooth. Pawls 17 and 18 are fastened to shafts 13 and 14 respectively. As these shafts rotate the pawls engage the projections 15 and 16, and during subsequent rotation can cause rotation of gears 11 and 12 respectively. The upper eleven tooth gear set 12 may be brought into engagement with the primary gears 221 or 220 of a computer carriage 93. The shafts 13 and 14 are mounted to rotate in frames 23 and 24 respectively. These frames themselves are pivotally mounted on shaft 10. The frames 23 and 24 have flanges 25 and 26 respectively, running parallel to the shafts 13 and 14. The flanges have nibs which engage with the projections 15 and 16 of the gears 11 and 12 and the pawls 18 and 19 respectively.

As shown in FIGURE 25a, in the rest position the pawls 17 of the lower gear set 11 are in contact with the upper side of the flange 25 which functions as a stop and the projections 15 of this gear set are in contact with the underside of flange 25 which functions as a stop. In the rest position the projections 16 of the gears 12 are held against the underside of the stop 26 by pawls 18. The gear sets 11 and 12 are out of engagement and spaced from each other in the rest position.

The entry value is transferred in this position to the lower gear set 11 as outlined earlier.

Referring now to FIGURE 25b: During the rotations of gears 11 in counter-clockwise direction through angles the projection 15 on each of these gears moves in corresponding rotation away from its stop 25. By means to be described later, gear set 11 is lifted until its gear disengages from value entry rod 9 and engages with the upper gear set 12. This is shown in FIGURE 25c.

As indicated in FIGURE 25d, the upper gear set 12 also engages counter carriage primary gears 220 and 221. Shaft 13 is then clockwise rotated. Pawls 17, which are fastened to shaft 13, also rotate clockwise, while gears 12 are rotated counterclockwise, see FIGURES 25e and 25f. After rotation through various angles, determined by the previous positions of gear wheels 11 in the various orders, each pawl 17 comes in contact with projection 15 of its appropriate gear wheel 11. Henceforward, as shown in FIGURE 25g, gear wheel 11 is forced to rotate clockwise until projection 15 comes into contact with stop 25. The gear 11 thus moves only through an angle of rotation equal to its initial angular displacement, i.e., the angle between the projection 15 and stop 25 prior to the start of rotation of shaft 13. This clockwise rotation of gear 11 is transferred counterclockwise to gear 12 with which it is engaged, and simultaneously clockwise to the respective main gear 220 of the counter carriage. Thus the initial entry value is now entered into the main counter mechanism. Shaft 14 is driven counterclockwise simultaneously with shaft 13. The pawls 18 of shaft 14 do not engage the projections 16 of upper gears 12, however, since these pawls 18 first move away from projections 16 which are at a standstill between the position of FIGURES 25e and 25f, and then move at the same angular speed as projections 16 when gears 12 are turned counterclockwise by gears 11 from the position of FIGURE 25f to the position of FIGURE 25g. As shown in FIGURE 25h, after completion of transfer of the initial entry value into the counter carriage by the engaged gear sets 11 and 12, gears 12 are disengaged from the primary gears 220 while remaining engaged with gears 11. Shafts 13 and 14 are then driven in the opposite direction so that pawl 17 turns counterclockwise and pawl 18 clockwise. As shown in FIGURE 25k, each pawl 18 of upper gear set 12 soon contacts projection 16, after which gear 12 is also rotated. Since the gear sets 11 and 12 are mutually in engagement, the last mentioned rotational movement of the gear 12 is transmitted to gear 11 until projections 16 abut stop 26 (FIGURE 25l). Thus the value is again entered into the lower gear. Pawl 17 during this movement rotates at the same speed as projection 15, and does not contact it. As seen by comparison of FIGURE 25l with FIGURE 25c, at the end of this movement both gear sets 11 and 12 again have the same position they had immediately after the transfer of the initial entry value into the lower gear pair 11 through value entry rod 9. Thereby the initial entry value is again immediately available. This makes it possible to add it anew during multiplication to the value entered into the counter carriage. For this purpose the operational cycle described with reference to FIGURES 25d to 25l inclusive is immedately repeated.

The above described arrangement has the particular advantage in that each movement which causes the transfer of a numerical value is limited by a fixed stop. Thus, even at the highest speeds of calculation no movement can be driven by inertia beyond the point assigned to it. During value entry into the storage mechanism the value entry rods 9 rest firmly against the rear ends of setting pin gear racks 67, which in turn are held against the setting pins 62. During the transfer of a value from a lower gear 11 to an upper gear 12 and to the counter carriage the transfer movement is limited by the contact of projection 15 against the corresponding stop 25. The movement which effects the re-transfer of this value to lower gear 11 again is limited by abutment of projections 16 and pawl 18 on the corresponding stop 26.

Referring now to FIGURE 25m: When the entry value is to be erased from the storage mechanism, both gear sets 11 and 12 will be disengaged, since the upper gear 12 already is in its cleared position. As shown in FIGURE 25n, the pawl 17 of th lower gear 11 will be driven in clockwise direction to come into contact with projection 15 and to drive gear 11 into its original position shown in FIGURE 25o. Thereupon (FIGURE 25p) the pawl 17 is again returned to its original position.

The calculating machine of this invention is fully automatic in its operation. From the foregoing it is evident that, for the purpose of feeding entry values into the counting carriage, the following control and drive elements are required:

(1) A drive mechanism for moving pawls 17 and 18.

(2) A control mechanism for lifting and lowering the gear sets to cause the lower gear 11 to engage the value entry rod 9, and to cause the upper gear 12 to engage the primary gears 220 and 221 of the counter carriage.

(3) A control mechanism for bringing both gear sets into mesh.

*I. 1.—Drive Mechanism for the Storage Pawls*

Figure 6:
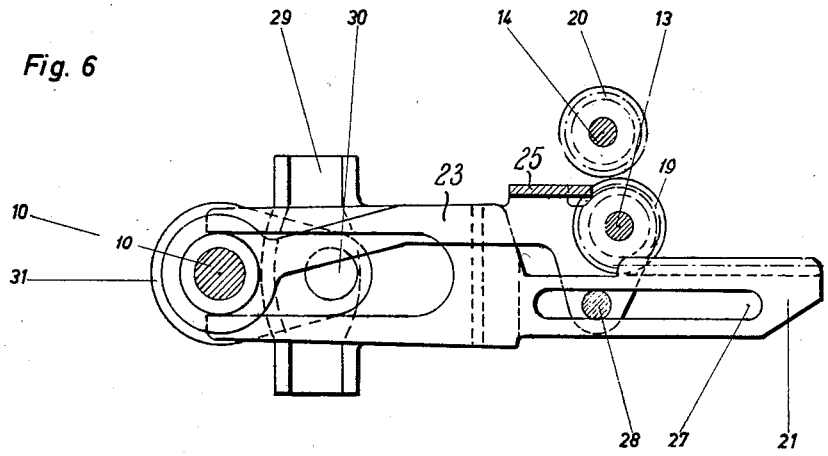
FIGURE 6 is a view of the pawl drive of the storage mechanism.

The pawls 17 and 18 are mounted on shafts 13 and 14, at the right end of which, as shown in FIGURE 6, are mounted gear wheels 19 and 20, respectively. The lower gear wheel 19 is in permanent engagement with a rack 21, which is provided with a slot 27. In this slot rides guide pin 28 of gear frame 23. The rear end of the rack has a wide fork-shaped slot, which rides over the main drive shaft 10. On rack 21 is an extension 29 which serves as a cross-slide. Roller 30, on the end of crank 31 mounted on shaft 10, moves in this cross-slide. During a constant speed rotation of crank 31 rack 21 remains initially at rest, due to the particular shape of the cam-slot in the cross-slide. The rack is then moved rearwards, rests momentarily, and then moves forward. During this back and forth movement the pawls 17 rotate through 360° about shaft 13, first one way and then back.

*I. 2.—Control Mechanism for Lifting and Lowering the Shifting Gear Sets of the Storage Mechanism*

Figure 5:
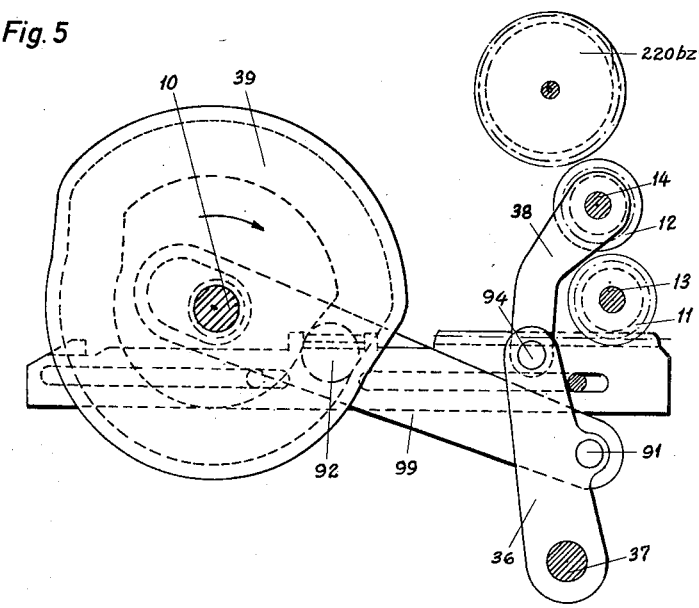
FIGURE 5 is a view of the control mechanism for engaging and disengaging the gear-sets with gears of the main counter-mechanism.

As shown in FIGURE 5, to provide for engagement or disengagement of the upper gear set 12 with the primary gears of the computer mechanism or of the counter mechanism, a gear set lifting lever 36 mounted on shaft 37 is provided. At the free end of lever 36 a pin 94 pivotally supports a toggle 38, which is also linked to shaft 14 of the upper gear set 12. On the main drive shaft 10 is mounted the lifting cam 39 with a cam groove in which runs a roller 92 mounted on a slide bar 99. The slide bar has a slot at its rear end which fits over shaft 10. Its front end is pinned to lever 36 at 91. Lever 36 and toggle 38 form a toggle lever, which is driven by cam 39 via slide bar 99. When gear set 12 is in the fully lifted position, pin 94 lies on a straight line between shafts 14 and 37.

This toggle lever control has the particular advantage that the storage mechanism can always be brought firmly and surely into engagement with the counter carriage.

I. 3.—Control Mechanism for Coupling of Gear Sets 11 and 12

Referring to FIGURE 7: On shaft 143 is mounted the gear set coupling crank 32. On upper gear set shaft 14 is mounted the coupling cam 40, with its cam slot riding on lower gear set shaft 13. The free ends of coupling crank 32 and coupling cam 40 are articulated to opposite ends of link 34. At one end of the travel of coupling crank 32, the two gear sets 11 and 12 are uncoupled. When crank 32 is at the other end of its travel shaft 13 is moved such that the gear sets 11 and 12 are in engagement. Detent pawl 44, biased by spring 46, locks the coupling crank 32 at either end of its path of travel. When gear sets 11 and 12 are not in engagement, drive gear 20 (which drives pawl 18) is secured against unintentional rotation by a slide 45 engaging the teeth of this drive gear. This slide 45 runs along frame 24, and is controlled by a cam surface 48 on coupling cam 40. When the gear sets 11 and 12 are coupled together, the cam follower 145, riding on cam surface 48, pushes slide 45 back out of engagement.

II.—AUTOMATIC CONTROL OF THE PARTS WHICH ENTER THE ENTRY VALUES INTO THE COMPUTING MECHANISM

Referring now to FIGURES 4 and 5: Depressing of the addition key 100 closes the motor start switch 115 and simultaneously engages the addition clutch 122. A bolt mounted on a rotating portion of the clutch, by operation through rod 153 and associated linkage, actuates the input main clutch 134. Shaft 137 driven by clutch 134 unlocks the value entry rods 9, which then enter the selected entry value into the lower gear set. As will be described with reference to FIGURE 4, rotation of shaft 137 causes motion of notch plate 138, pin 142, arm 144, shaft 143, and lever 32 to shift coupling cam 40 (FIGURE 7) in the proper direction to cause engagement of gear sets 11 and 12 of the shifting storage mechanism. As shown in FIGURES 3 and 4, a pin 151 on disk 150 ((also driven by shaft 137) via other linkages actuates the main storage controlling clutch 161, shown in FIGURE 8. This causes rotation of the main drive shaft 10, and also of the storage mechanism lifting cam 39 (FIGURE 5) which is mounted on the main drive shaft 10. This lifts upper gear sets 12 through toggle 38, together with the lower gear sets 11 with which they are already held in mesh by number 40 (FIGURE 7), into engagement with the gears 220 and 221 of the counter carriage 93. As explained with reference to FIGURE 7, coupling cam 40 connects shafts 13 and 14, so that the raised shaft 14 takes along shaft 13 with gears 11 in the position of FIGURE 25c. As already described with reference to FIGURE 25, main shaft 10 also drives the pawls 17, 18 through racks 21 and gears 19, 20 (FIGURE 6) to enter the entry values into the computer mechanism. The gear sets 11 and 12 are disengaged from the computer mechanism in the same manner, and the pawls 17 and 18, see FIGURES 2 and 25, are driven again to transfer the entry value from the upper gear set 12 into the lower gear set 11. During this operation, as soon as the lower gear set 11 is lifted from the value entry rods 9 (FIGURE 25c), the value entry rods are returned into their original position by the action of cam 184 mounted on input clutch shaft 137 as shown in FIGURE 2. At this point the clearing operation (to return the above components to their original position) has begun. This will be described later, in Section III.1.

As shown in FIGURE 4, depression of the addition key 100 causes pivoting of two rocker arms 104 and 334, which are mounted on a common shaft 103. Rocker arm 104 controls the addition clutch 122 to initiate the operation by which the entry value was entered into the computer mechanism since first input clutch 134 and then storage controlling clutch 161 are operated, as described above. Rocker arm 334 disengages detent 344 (see FIGURE 4) which is operative only during multiplications and divisions and has no function during additions and subtractions.

Referring also to FIGURE 12: Depression of key 100, which causes a pivoting movement of the rocker arm 334, also results in movement of crank 335. This crank is attached to a connecting rod 336, on the opposite end of which is linked a bell crank 337, which is in turn mounted outside the apparatus sidewall on peg 338. On an upper traverse 339 of the apparatus housing is mounted a spring loaded slide 340. This slide is provided with tangs 341 and 342, which serve to prevent movement of the detent 344 (see FIGURE 4) into the counter mechanism. A tension spring 428 (FIGURE 4) pulls the detent lever 429 (mounted in the counter mechanism) into counter clockwise direction. This lever 429 controls another lever 430 to which is linked the addition detent 344 as shown in FIGURE 4. This detent 344 is connected with lever 429 by slot 431. A pin on lever 429 projects into slot 431 of detent 344. Detent 344 is raised by lever 430. When lever 429 is located between projections 341 and 342, see FIGURE 12, the arm of lever 429 carrying pin 513 is forwardly positioned and detent 344 can engage wheels 220 or 221. If the upper end of lever 429 abuts projections 341 or 342, as shown in FIGURE 4, the lever arm with pin 513 is inwardly turned and detent 344 cannot engage wheels 220, 221. When tanks 341 and 342 on slide 340 prevent movement of the detent lever 429, the addition detent 344 is also prevented from entering the counter carriage primary gears 220 or 221, and the counter mechanism is not driven. Addition detent slide 340 projects through the apparatus side wall. At its end is a pin 432, which is guided in slot 433 of the bell crank 337. Detent lever 429 is effective when the result of a multiplication is added to an amount registered in the counter mechanism, and when detent 344 is located opposite the subtraction wheels 221. As shown in FIGURE 12, two levers 429 are provided, one of which is inactivated by projection 341, or 342 of slide 340.

In this embodiment of the invention two detents are utilized—one for positive and the other for negative calculating operations.

As shown in FIGURE 4, the rocker arm 104, which serves to engage the addition clutch 122, is mounted on the same shaft 103 as the addition detent rocker arm 334. The rocker arm 104 acts on one arm of a bent lever, which is mounted on a sleeve on shaft 103. This sleeve, which can oscillate relative to shaft 103, also carries crank 105. Crank 105 is linked to a pull rod 108, which has a hook shaped front end 109. This rides over pin 110 on lever 111. One arm of this lever contacts one arm of bell crank 112, which rotates with shaft 113. Another arm 114, mounted on shaft 113, actuates the electric switch 115 in the circuit of the main drive motor 90. By way of several transmission gears the motor drives the main power shaft 116. Several gears are keyed to this shaft, including the gear set clutch drive pinion 117. By means of a gear train of gears 118 and 119, gear 120 is driven. Ratchet wheel 122, a part of the addition clutch, is secured to gear wheel 120. Both rotate on shaft 121. This of itself prior art clutch has a clutch housing 123, and a clutch plate 124, which is rotatable relative to the ratchet wheel 122. On the clutch plate 124 is mounted a ratchet pawl 126 pivotally on pin 125. The ratchet pawl 126 is held against the toothed periphery of the ratchet wheel 122 by a leaf spring. In its at rest position, the motor start switch actuating lever 111 mentioned above keeps the ratchet pawl 126 out of engagement with the teeth of the ratchet wheel 122. As soon as lever 111 is rotated free of ratchet pawl 126, the pawl 126 drops into the ratchet-wheel 122, so that clutch plate 124 also rotates. A bolt 128 is mounted on plate 124; and during the rotation of clutch plate 124 it contacts a trip 130 mounted on a shaft 129, causing limited rotation of this shaft. This rotation is transferred to the gear set clutch actuating lever arm 131, which is thereby swung forward, releasing the ratchet pawl 133 of the input main clutch 134. As with the previously described clutch, ratchet pawl 133 is mounted on a clutch plate 132. In its engaged position pawl 133 falls into ratchet wheel 134, which is fixed to gear 135 (see FIGURE 3), driven by a pinion 136 mounted on shaft 116. Referring again to FIGURE 4. When the actuating lever 131 is swung out and the clutch 132, 133 and 134 thereby engaged, the shaft 137 is rotated. This shaft 137 carries a notch plate 138, whose nib 139 rotates a lever 140, mounted on shaft 141. On shaft 141 is mounted the stop plate 7 for value entry rods 9. Stop plate 7 is therefore lifted immediately upon engagement of the input main clutch 134 so that the value entry rods 9 can pick-up the entry value recorded into the pin carriage. Notch plate 138 also carried a pin 142, in the path of which is mounted an actuating arm 144. As shown in FIGURES 3 and 4, arm 144 is mounted on coupling crank shaft 143. Upon a predetermined rotation of shaft 137 actuating arm 144 is swung out by pin 142. As explained above under I.3 the gear set coupling crank 32 swings coupling cam 40 so that gear sets 11 and 12 are coupled together.

As described in paragraph I.2, the storage controlling main clutch 161 controls the lifting and lowering of the gear sets 12 into engagement with the primary gears 220 and 221 of the counter carriage. This clutch is actuated through input main clutch 134. As shown in FIGURES 3 and 4, on the hub of clutch plate 132 is mounted another plate 150, which carries a pin 151. One arm of a bell crank 152 is positioned in the path of pin 151. The bell crank is mounted pivotally on shaft 129. The other arm of the bell crank is linked to push rod 153, which runs forward toward the function keys. An extension 107 is provided on rocker arm 104, which is pivoted on shaft 103. On another arm of this extension 107 a spring 106 is provided. This maintains the rocker arm 104 in its rest-position. The extension 107 reaches under the front end of the push rod 153, such that this end is lifted upon depression of the addition key 100. A tang 154 on push rod 153 is thereby brought into contact with the tang 155 of lever arm 156 mounted on shaft 157. When pin 151 is driven by input main clutch 134 into contact with bell crank 152, push rod 153 is moved forward, moving lever arm 156 and transmitting a rotation to shaft 157. As shown in FIGURE 8, on the other end of shaft 157 is mounted crank 158. This operates on pull rod 159, which is linked to the trip lever 160. When pin 151 contacts the arm of the push rod bell crank 152, the trip lever 160 releases the main drive clutch pawl 161', which rests against it. Thus the pawl engages the teeth of the ratchet wheel 162. This ratchet wheel 162 is connected to the drive gear 163, which is driven from the main power shaft through gear 164. When the main drive clutch 161 is engaged, clutch plate 165, on which pawl 161' is mounted, drives the main drive shaft 10. As shown in FIGURE 5, to this shaft is connected lifting cam 39, which controls the lifting and lowering of upper gear set 12, as described in I.2.

As described in paragraph I.1, the pawls 17 and 18 are driven by the main drive shaft 10, over pawl drive rack cross-slide 29. The lifting cam 30 and the cross-slide 29 are arranged relative to each other on the main drive shaft 10 in such a manner, that, depending on the angular position of the main shaft 10, the following operational steps occur:

*Rotation up to 30°.*—The coupled gear sets 11 and 12 are brought into engagement with the gears 220, 221 of the main counter mechanism.

*Rotation up to 150°.*—The pawls 17 and 18 are rotated in the proper direction to transfer the entry value into the main counter mechanism as explained with reference to FIGURE 25.

*Rotation up to 180°.*—The gear sets 11, 12 are disengaged from the main counter mechanism.

*Rotation up to 360°.*—The pawls 17, 18 rotate in the opposite direction. The upper gears are thereby returned to zero setting and the entry value is re-transferred to the lower gears 11.

III.—CLEARANCE OF THE STORAGE MECHANISM AND RETURN OF THE VARIOUS MEMBERS INTO THEIR ORIGINAL POSITIONS

III. 1.—*Clearing the Storage Mechanism*

Upon completion of a calculation, the storage mechanism is in the position shown in FIGURE 25*l*. The entry value has been re-entered into the lower gear set 11; the pawls are in the original positions; gear sets 11 and 12 are coupled together, but are out of engagement with the computer carriage primary gears 220 and 221. In order to clear (or cancel) the value entered into the lower gear set 11, the clearing main clutch 175 is used. As shown in FIGURE 8, this is actuated from pin 180 on the clutch plate of the storage controlling main clutch 161. Pin 180, via an attached crank, causes rotation of shaft 143, which actuates coupling cam 40, which in turn causes uncoupling of the two gear sets 11 and 12 as shown in FIGURE 25*m*. During uncoupling, however, the lower gear set 11 engages the value entry rods 9. Therefore, the uncoupled gear sets 11 and 12 must be lifted, as shown in FIGURE 25*n*, in order to bring the upper gear set 12 into engagement with the gears 220, 221 of the calculator carriage. The lower gear set 11 is now free and may be returned to zero position by the lower pawl 17, as shown in FIGURE 25*o*. The gear sets are again lowered until the lower gear set 11 again engages the value entry rods 9. Thus the value entry rods are ready to receive a new entry value, which in the meantime has been entered via the number keys into the pin carriage. Meanwhile, the pawls 17 of the lower gear set return to their initial position, as shown in FIGURE 25*p*. Automatic cancellation occurs generally as follows (refer to FIGURES 3 and 8):

There is a pin 166 on the clutch plate 165 of the main storage controlling clutch 161. In the path of this pin 166 is beveled surface 167 of lever arm 168. Arm 168 is pivotally mounted on shaft 143 and is linked to rod 169, which carries a square projection 170. This projection is in close proximity to tank 172 on push rod 171. Tang 172 runs transverse to parallel rods 169 and 171.

As shown in FIGURE 3*c*, the end of push rod 171 is linked to trip lever 173 of clearing main clutch 175, which keeps the ratchet pawl 174 out of engagement with the ratchet wheel 175'. This ratchet wheel 175' is driven by the main power shaft 116 via gears 177 and 178. On the hub of the cancellation clutch plate 176 (which carries the ratchet pawl 174) is also keyed a cam 179, which carries the uncoupling actuating pin 180, shown in FIGURES 3 and 8. In the path 180 is arranged an arm 181, keyed to shaft 143. Thus, as shown in FIGURE 7, the engaged clutch 175 rotates shaft 143, which actuates the shaft uncoupling cam 40, and thus uncouples gear sets 11 and 12.

As shown in FIGURES 3 and 8, trip lever 160 of the main drive clutch 161 has a perpendicular tang 183, which protrudes into the path of projection 182 of the cam plate 179. As the clearing main clutch 175 turns and the cam plate projection 182 actuates the trip lever 160, the main storage controlling clutch 161 is again engaged. The operation described in part II above is repeated, except for the difference that the two gear sets 11 and 12 remain disengaged from each other. Thus, in sequence, both gear sets are lifted, the pawl 17 is driven, the gear sets are lowered again, and the pawls 17, 18 are in their original positions. Since the gear sets 11 and 12 are disengaged the gears 19 and 20 are also disengaged and pawl 18 is not driven.

III. 2. *Return of the Value Entry Rods 9 to Their Original Positions*

As soon as the lower gear set 11 is lifted from the value entry rods 9, these rods are returned to their initial positions. Thus a new value may be entered into the pin carriage, as long as the machine is in operation. The return of the setting pin gear racks 67 is accomplished via shaft 137, which is driven by the gear set clutch 134. The value entry rod return cam 184 is mounted on shaft 137 as shown in FIGURE 3 and in broken lines in FIGURE 2. On the periphery of cam 184 rides a roller 184', mounted on a double armed lever 185, which is pivotally mounted on pin 186 in the housing of the apparatus. On the end of lever 185 away from roller 184 is linked a connecting rod 187, the other end of which in turn is linked to crank 188 mounted on shaft 189. As shown in FIGURE 2, two other arms 190 are mounted on shaft 189. These end in open slots 191, in which ride pegs 192 of yoke 193. This yoke 193 is so shaped that it can engage the tangs 194 of the setting pin gear racks 67 of the pin carriage. Thus when the gear set clutch 134 is engaged, yoke 193 is moved backward by arms 190, carrying with it tangs 194 of the setting pin gear racks 67. Value entry rods 9 ride against the rear ends of gear racks 67; hence these too return to their original positions. After arrival in their original positions, value entry rods 9 are retained by engagement of stop plate 7 over tangs 195.

The setting pin gear racks 67 have a slant surface underneath their front ends, which serves to push the shift pins 73 downwards to their original positions. In this position the upper striking surfaces 72 of the gear racks 67 rest against the shift pins 73 since the recess, through which these ends of the gear racks 67 had moved in the operating position, has now been pushed downwards.

III. 3.—*Return of the Pin Carriage to its Initial Position*

On shaft 137, which is driven by gear set clutch 134, is mounted still another cam 196, shown in FIGURE 2 in dotted lines, and in FIGURE 3. A cam follower on crank 197 rides on this cam. Crank 197 is pivotally mounted on pin 198 and a push rod 199 is linked to it. The other end of push rod 199 is linked to an arm of a bell crank 200. To the other arm of bell crank 200 is linked a pin carriage return rod 201 as shown in FIGURE 3. The extremity of this rod is bent over 90°, through which is a hole in which rides the pin carriage cross shaft 65. After a predetermined rotation of shaft 137 a movement is imparted to the cam follower crank 197. This is transferred by the bell crank 200 to the return rod 201 in such a manner that the pin carriage is returned to its initial position by the bent over portion of the return rod 201.

As best seen in FIGURE 19, the setting pins 62 are lowered to their original positions by means of a wiper rail 204, whose end 205 is bent at an appropriate angle to depress the setting pins to their original positions during the return of the pin carriage.

III. 4.—*Clearing a Depressed Function Key*

Referring to FIGURES 4 and 8: A depressed function key rests in a catch 210. The function keys are released only when cancellation clutch 175 is engaged. Actuating pin 189, which via appropriate linkages initiated uncoupling of the gear sets, later runs against an angular arm of lever 212, mounted on pin 211. On the other arm of lever 212 is linked a pull rod 213, which extends from front to rear of the entire calculator. The other end of pull rod 213 is linked to crank 214 mounted on shaft 215. Function key catch 210 is mounted on shaft 215, so that when this shaft is rotated, the function key is released.

III. 5.—*Electric Motor Switch Operation*

In II above was described a sequence of operations for closing the electrical start switch 115 of motor 90. It was outlined that this switch was actuated by actuating lever 111 on the addition clutch 122 by rotation of shaft 113. In a similar manner, all other function keys of the apparatus work upon other cranks mounted on shaft 113. Actuating levers are driven by on the clutch 161, clutch 175, and all other clutches of the apparatus control shaft 113, so that start switch 115 remains closed as long as any one of these clutches is engaged.

IV.—THE COMPUTER CARRIAGE

As shown in FIGURES 2 and 17, the computer carriage 93 consists of the calculating mechanism 216 and the counter mechanism 217. The computer carriage is mounted on a shaft 218 and on rollers 219. It has a bent sheet metal frame, in which is mounted shaft 247 with its primary gears and two cams 22. Alternately on shaft 247 are arranged the primary gears 220 for addition and primary gears 221 for subtraction. Refer to FIGURES 2 and 17. The teeth of primary gear 220 mesh with gear 222. The two gears 222 and 224 are connected by a common hub, mounted to rotate on shaft 223. Gear 224 meshes with the number wheel gear 226 on shaft 227. Number wheel gear 226 is fastened to the number wheel 225. Pawl 229, actuated by spring 228 engages a tooth of gear 226 to guard against unintentional rotation of the number wheel and the gears connected therewith. Primary gear 221 for subtraction meshes with the intermediate gear 231 mounted on shaft 230. Gear 231 rotation is transmitted finally to one of the gears 224. With gears 220 and 221 rotating in the same direction, the intermediate gear 231 reverses the rotation of the number wheel 225, as compared to the direction in which it rotates during addition.

The cancellation of the values entered into the calculating mechanism and the counter mechanism is accomplished by clearing gears 233 known to the prior art. The clearing gears are mounted on shaft 232 and engage the gears 231. In addition, gears 234 are also mounted on shaft 232. A very long idler gear 235 is mounted in the apparatus housing, such that it engages gears 234 in every position of the carriage. Gear 235 is coupled with gears 236, 237 and 238 by means of a clutch similar to those previously discussed. Clutch shaft 239 is driven directly from the motor drive shaft 242 by means of worm gears 240 and 241. As shown in FIGURE 13, depression of clearing key 243 for the calculating mechanism is transmitted via crank 244 and pull rod 245 to cause rotation of the trip lever 247a. Thus the clutch plate 248 and the gear 237 connected therewith are rotated and the calculating mechanism is returned to zero via the above described gears and linkages.

A corresponding mechanism is provided for the counter mechanism.

A spring 251 pulls the computer carriage to the left, as viewed from the front of the machine. As shown in FIGURES 2 and 21, a ratchet pawl 252 is mounted pivotally on the computer carriage. The pawl 252 engages ratchet teeth 253 of ratchet 246, mounted on the apparatus case. This holds the carriage in a steady position against the pull of spring 251.

V.—ADDITION

As shown in FIGURE 21, during an addition the computer carriage is in a position in which pawl 252 rests against the largest tooth 253, at the end of the carriage return ratchet 264. By depression of the addition key 100 the entry value is transferred to the primary gears 220, as described above in paragraphs I and II. The clearing operations described in paragraph III follow thereafter. This restores the pin carriage and the storage mechanism to zero position, but retains the entered value in the calculating mechanism.

The next number is then entered into the pin carriage, transferred to the storage mechanism, and again transferred to the calculating mechanism. This last step adds the new number to the already existing number in the calculating mechanism.

The addition cycle requires the actuation of four clutches. This occurs automatically, however, upon depression of the addition key. Contrary to the prior art calculators, which require a separate electrical contact for every engagement of a clutch, the embodiment of the present invention requires only a single switch for all operational cycles of the apparatus.

VI.—SUBTRACTION

Subtraction is accomplished in substantially the same manner as addition, except that the computer carriage must be moved so that instead of the addition gears 220, the subtraction gears 221 engage the upper gear sets 12 of the storage mechanism. This movement of the computer carriage is accomplished as follows (see FIGURE 18): Depressing the subtraction key 254 engages a subtraction clutch 257 by means of rod linkages similar to those previously described. The subtraction clutch 257 drives a cam 259, which causes an appropriate movement of the ratchet 264, thus moving the counter carriage. Simultaneously, the same transfer and cancellation functions are accomplished as were accomplished by the depression of the addition key 100.

The movement of the computer carriage in such a manner as to permit engagement of the subtraction main counter gears 221 with the upper gear set 12 occurs as follows (refer to FIGURE 18): Depression of the subtraction key 254 swings bell crank 255, causing a pull rod 256 linked to bell crank 255 to disengage the pawl trip for subtraction clutch 257, clutch rotation drives the cam 259, which is fixed to clutch plate 258.

A roller cam follower 260 rides on cam 259. As shown in FIGURES 18 and 21 the free end of cam follower 260, adjacent to the roller, actuates a push-rod 261 running in a horizontal direction. The push rod 261 has a slant surface 262 on which rides a roller 263 mounted near the end of the slide ratchet 264. The ratchet teeth, of which the end tooth 253 is largest, are on the end opposite roller 263. Pawl 252 of the computer carriage engages this ratchet 264. When the cam follower 260 is moved outwards by cam 259, this motion is transferred to ratchet 264 through push rod 261 and its wedge-shaped slant surface 262. The ratchet 264 thereby moves the computer carriage into the subtraction position. The slide ratchet 264 is guided by means of a guide slot over the fixed guide pin 149. Depression of the subtraction key 254 simultaneously actuates the switch crank 105 (FIGURE 16) so that the same operations described above under paragraph V for the addition operation are performed.

VII.—MULTIPLICATION

The main advantage of the calculating machine of the present invention lies in the fact that multiplication is fully automatic.

The machine is so controlled that first the multiplier is entered into the counter mechanism and thereafter the multiplicand into the storage mechanism. Since the apparatus of the present invention performs multiplication by repetitive addition, the multiplicand is entered into the calculating mechanism as many times as is demanded by the multiplier in the counter mechanism. It is advantageous to begin the multiplication with the highest order.

To enter the multiplier into the counter mechanism the computer carriage is moved to the left until the upper gear set 12 engages the gears 220 of the counter mechanism. To accomplish this, the ratchet teeth 253 of ratchet 264 (FIG. 21) are removed from the path of ratchet pawl 252 to permit movement of the carriage to the left until a fixed stop 288 (FIG. 17) terminates this movement. Thereafter the multiplier is entered into the counter mechanism by the operation cycles previously described.

In the following operation cycle, the computer carriage is returned to its original position by means of a drawstring driven by the carriage return clutch 296. The entry value (multiplicand) is then entered into the storage mechanism, and from there into the calculating mechanism as many times as the multiplier in the counter mechanism demands. The counter carriage is actually returned a small distance past its original position to permit initiation of the multiplication by the highest actuated multiplication lever 320 (FIG. 14) on the notches 319 of multiplication hook 312.

In contrast to the operation cycles previously described, during multiplication the main clutch 161 is not actuated by the input clutch 134 but rather by rod linkage from the computer carriage. The multiplicand is now transferred into the calculating mechanism as often as the initial digit of the multiplier in the counter carriage demands; that is, until a detent 344 (FIG. 4) returns the several orders of the counter mechanism to its zero position. The computer carriage tends to be drawn to the left by spring action, but is held in position by a multiplication hook 312, which is positioned by the outer end of one of multilevers 320. As soon as the respective order of the counter mechanism returns to zero, the engaged multiplication lever 320 releases the notch 319 of the multiplication hook 312; and the computer carriage jumps to the next digit position.

Upon completion of the calculation operation at the last digit position, a precancellation clutch 327 is actuated, which returns the computer carriage, which was moved to the left by the calculations at the various digit positions, back to its original position. Thereupon the cancellation clutch 175 is actuated whereby the previously described cancellation operations are initiated as follows:

VII. 1.—*Entry of the Multiplier*

Referring to FIGURES 3 and 4. Upon entry of the multiplier into the pin carriage, the multiplication (×) key 265 will be depressed, which causes pivoting of the rocker arms 266 and 267. An extension 268 of rocker arm 267 actuates the bent lever 269, whose other arm engages the computer carriage ratchet slide 264, swinging the toothed end out of engagement with the ratchet pawl 252. This allows the computer carriage 93 to be drawn to the left by a string drive actuated by spring 251. Stop 288 on the computer carriage (see FIGURE 17) engages hook 274 (see FIGURE 14) which is positioned in the path of the stop. This arrests the leftward movement of the computer carriage 93. Hook 274 was moved into the path of the stop bar as follows (refer also to FIGURE 4):

Upon depression of the × key 265, another arm of rocker arm 266 actuates linkages 270 and 271, which further actuate the ratchet hook 273. Hook 273 is mounted pivotally on a control guide 272 which is movable in its longitudinal direction. The engagement surface of the free end of the hook 273 is designated in FIGURE 14 as 274.

The rocker arm 267 is so designed that it will contact an angular projection of crank 105, in order that the entry value (multiplier) will be entered into the shifting mechanism.

Engagement of the storage controlling main clutch 161, however, is not initiated by action of the clutch push rod 153 on lever arm 156, since push rod 153 has not been lifted by the rocker arm extension 107 of clutch 122 to enable push rod 153 to engage tang 155 of lever arm 156. Instead, for the multiplication operation, the main clutch 161 is actuated directly from the computer carriage. Referring to FIGURE 14. When stop 288 of the computer carriage engages the contact surface 274 of the arresting hook 273, the control guide 272 (on which hook 273 is mounted) is moved a short distance to the left, in the direction of the movement of the computer carriage. Guide rail 272 has a small slot 278, in which rides the end of an arm of the actuating crank 276. Movement of control guide 272 rotates crank 276. The other arm of crank 276 engages a tang on pull rod 159, which thus draws trip lever 160 from under the clutch pawl 161' of the main clutch 161. Thus the clutch 161 is engaged, the gear sets 11, 12 are lifted and lowered as described in paragraphs I.2 and I.3, and the pawls 17 and 18 are driven. The clearing main clutch 175 is then actuated by the storage controlling main clutch 161, so that the multiplier is cleared from the storage mechanism.

VII. 2.—*Entry of the Multiplicand*

Referring now to FIGURES 3 and 16. Upon entry of the multiplicand into the pin carriage the multiplication (×=) key 290 is depressed. This rotates two rocker arms 291 and 292. Rocker arm 291 actuates pull rod 293, which is linked to trip lever 294 for ratchet pawl 295 of the carriage return clutch 296. This clutch is driven by shaft 116 via gears 297 and 298. Gear 300, mounted on the hub of clutch plate 299, drives gear 301 on shaft 302. As shown in FIGURE 15, a pulley 305 is driven by a pair of gears 303 and 304 mounted on the side of the apparatus housing as shown in FIGURES 3 and 15. Over pulley 305 and guide pulleys 307 and 308 runs a rope 306 which returns the computer carriage 93 from its position after entry of the multiplier to its original position. Towards the end of the return movement, bolt 309 mounted on the computer carriage engages lever 310 mounted on the apparatus housing as shown in FIGURE 16. The other arm of lever 310 rides in a slot of a pull rod 293 and lifts it so that trip lever 294 can enter the path of pawl 295 of the carriage return clutch 296 and terminate the return movement of the carriage.

Rocker arm 292 is fashioned in such a manner that it is linked via arm 311 and a bridge to rocker arm 104 of clutch 122. Thus when the multiplication (×=) key 290 is depressed rocker arm 104 is also actuated and the addition clutch 122 and thereafter input main clutch 134 are actuated in the manner previously described.

On actuating rocker arm 292 there is an additional arm 313 which actuates crank 315 mounted on shaft 64. Shaft 64, which runs transversely across the entire machine, is one of the shafts on which the pin carriage 63 is movably mounted. At its other end is mounted a crank 313, with a 90° tang which contacts the push rod 171 of clearing main clutch 175. Depression of the multiplication key (×=) 290 thus also actuates push rod 171 so that the linkage between the main drive clutch 161 and main clutch 175 is disconnected, and main clutch 175 is therefore not actuated by the clutch 161. The entry value thus remains in the storage mechanism after its transfer to the calculating mechanism and after re-transfer from the gear set 12 to gear set 11 in the storage mechanism.

As shown in FIGURES 3 and 16, rocker arm 292 also has an extension 318 which contacts one arm of a lever 317. The other arm of lever 317 projects upwards to engage multiplication hook 312, mounted pivotally on control guide 272 as shown in FIGURE 14. Multiplication hook 312 has a tooth 319 which enters the path of the first multilever 320 when the member 312 is turned.

The term "multilever" is an abreviation of "multiplication lever," and multilevers 320 are best seen in FIGS. 2, 14 and 17.

The multilevers 320 are operated in a similar manner as lever 252 which is arranged at the mechanism 216 while multilevers 320 are provided at the mechanism 217. Multilevers 320 are operated whenever the respective number wheel moves from zero to nine or from nine to zero during a division, and moves to zero during a multiplication.

Every counter gear 220 (see FIG. 2) meshes with a gear 222 which is connected to a gear 224 meshing with the gear 226 of a number wheel 225. Every subtraction counter gear 221 meshes through an intermediate gear 231 with a gear 224. A cam 321 is connected to gear 231 in each order and cooperates with a corresponding multilever 320 so that every time an order of the mechanism 217 is returned to zero position, the respective multilever 320 is operated and angularly displaced.

When the multilever is displaced, the calculator carriage can move one order to the left until the multilever 320 of the next order abuts hook member 312 and stops the calculator carriage. Consequently, the multilevers serve the purpose of causing a step of the calculator carriage when the calculating operation has been completed in an order. Furthermore, the multilevers 320 maintain the clutch 161, which provides the drive for the multiplication operation, in operative condition, since the bridge 272 on which hook member 312 is mounted is urged to the left by a multilever 320 abutting under spring pressure on hook member 312. The computer carriage, upon entry of the multiplier into the counter mechanism, is brought back into its original position by means of the carriage return clutch 296.

As soon as the carriage return clutch 296, see FIGURE 16, is disengaged the carriage return spring 251 is effective and pulls the counter carriage 93 to the left by means of the pulley and rope drive 305, 306 as best seen in FIGURE 15. Consequently the first multilever 320 engages the multiplication hook tooth 319. Since tooth 319 is mounted on control guide 272, the rail is so moved that the main drive clutch 161 (see FIGURE 8) is actuated by means of the actuating crank 276 as best seen in FIGURE 14.

While main clutch 161 is closed (FIGURE 8), motor switch is closed since lever 160 of clutch 161 acts with its arm 321 on an arm 322 secured to shaft 113. Turning of shaft 113 turns lever 114 which closes switch 115.

As described in paragraph III, gear sets 11 and 12 of the storage mechanism are disengaged by rotation of a crank mounted on shaft 143, actuated by pin 180 on the clutch 175. However, since the clearing clutch 175 cannot be actuated by clutch 161, due to interruption of the connecting linkage 171 by depression of the multiplication key, gear sets 11 and 12 of the storage mechanism remain in engagement. Thus, during each rotation of the main shaft 10, the entry value is again added into the calculating mechanism, and then again transferred into the lower gear set 11 by the upper gear set 12. The entry value thus again stands ready for entry into the calculating mechanism and simultaneously into the storing gear set 12 during the next rotation.

As best seen in FIGURE 4, while clutch 161 is engaged, an actuating pawl 344 is actuated once each revolution, in a manner known to the prior art, unless, as during addition and subtraction, it is disengaged. Thus, upon each revolution this pawl turns a stepping wheel in the respective order of the counter mechanism and reduces by one the number represented in the order of the counter mechanism until the counter wheel of the order back to zero. As shown in FIGURE 2, a projecting member 321 on an intermediate wheel 231 of counter mechanism 217 (FIGURES 1 and 17) turns the multilever 320 (FIGURES 2 and 14) so that the free end of this multilever 320 is thus disengaged from tooth 319 of the multiplication hook 312. This permits the control guide to move back to its rest position, thereby operating (by actuation of actuating lever 276 and pull rod 159) the trip lever of main clutch 161 to disengage clutch 161. The computer carriage is pulled a bit further by spring 251, so that the next multilever engages tooth 319 of the multiplication hook 312. Refer now to FIGURES 3, 17 and 22.

After the calculation in the last position of the multiplier is completed, the computer carriage makes one more small step so that the tang 323 mounted near the left end of the counter carriage (in the vicinity of ratchet pawl 252) engages one arm of bell crank 324, which is pivotally mounted for movement about a vertical axis as shown in FIGURE 3c and FIGURE 22.

The other arm of bell crank 324 rides in a slot in a pull rod 325 hinged to the trip lever 326 of the precancellation clutch 327. The pre-cancellation clutch 327 drives a cam plate 328 on which rides cam follower 329, to which push rod 330 is linked. One arm of a second bell crank 331, mounted on a vertical axis, rides in a slot in push rod 330. The other arm of bell crank 331 engages a tang 332 on the computer carriage and returns the computer carriage to its at-rest position. In the same manner as described earlier for the clearing main clutch 175 the pre-cancellation clutch 327 releases the function keys. This, however, also causes the return of the bent lever 269 to its original position so that the computer carriage ratchet 264, and, in particular, tooth 253, are again swung into position to engage the ratchet pawl 252.

The clearing main clutch 175 is immediately released by the pre-cancellation clutch 327. Cam follower 329, which rides on the cam plate 328 driven by the-cancellation clutch 327, has a tang 333 which engages trip lever 173 of the cancellation clutch 175. The cancellation clutch is thus engaged, which initiates the clearance of the shifting mechanism, as described in paragraph III. The multiplication result is read from the calculating mechanism number wheels.

VIII.—DIVISION

For division the dividend is entered into the calculating mechanism and the quotient appears in the counter mechanism. The basic difference between the division operation and the multiplication operation is that the value (divisor) entered in the storage mechanism is repeatedly deducted from the value (divided) entered in the calculating mechanism. The number of these subtractions (quotient) appears in the counter mechanism. Other changes relative to the multiplication operation result from the fact that the dividend is entered on the left side and not on the right side of the calculating mechanism. Further, instead of the addition primary gears 220, the subtraction primary gears 221 of the calculating mechanism are engaged; and finally an addition operation is interposed between the subtractions at each movement of the counter carriage to a new digital position.

The sequence of movement of the computer carriage 93 and of the pin carriage 63 during a division, will now be described with reference to FIGS. 26 and 27. When the division key 345 is actuated, the computer carriage 93 moves from its left end position shown in FIG. 26 to its right end position shown in FIG. 27 so that the storage mechanism 11, 12 is located in the region of the higher orders of the calculating mechanism. The pin carriage 63 is released to move from its normal end position to another end position in which the ordinally arranged rows of pins cooperate with the respective orders of gears 11, 12, and therethrough with the respective orders of the calculating means. During the following machine cycle, the dividend is entered into the highest orders of the calculating mechanism, whereupon the input carriage is returned to the right and the divisor entered. The input carriage 63 is then again placed in the position shown in FIG. 27, and the divisor entered into the highest order of the calculating mechanism, since the computer carriage 93 is still in the end position shown in FIG. 27.

VIII.1.—Entry of the Dividend

Referring now to FIGURE 11. The division key 345 actuates the rocker arms 334, 346, 266 and 291.

During the entry of the dividend into the calculating mechanism, in the manner previously described in paragraph II, the addition detent for actuation of the counter mechanism is held out of operation by rocker arm 334. This arrangement avoids the additional operation by a lever subsequent to the entry of the dividend, which is required by calculators of the prior art.

The dividend is entered on the left side of the calculating mechanism in order to provide a sufficient number of decimal positions during the division operation. To this end the pin carriage 63 is brought into its extreme left position and the computer carriage into its extreme right position.

Rocker arm 346, actuated by the division key 345, releases a division clutch 349 which moves the pin carriage 63 to its extreme left position. To accomplish this, rocker arm 346 actuates pull rod 350, the other end of which is linked to trip lever 347, which trips pawl 348 of the division clutch 349. The lower arm of trip lever 317 engages bell crank 352 mounted on shaft 113. By rotation of the shaft 113 the electric switch 115 is closed in a manner known to the prior art. Thus the clutch 349 is driven by the main power shaft 116 via intermediate gears. As shown in FIGURES 3 and 11 the division clutch 349 drives a cam plate 353 on which rides the cam follower 354. Cam follower 354 rotates a shaft on which crank 355 is mounted. Crank 355 engages one arm of ratchet 85, rotating it in such a manner that the ratchet teeth 86 are moved out of reach of shift extension 87 of the pin carriage.

Spring 88 then pulls the pin carriage longitudinally on the two shafts 64 and 65 to its extreme left position.

The division key also actuates rocker arm 291, which in turn actuates the carriage return clutch 296, as described in paragraph VII.2. Thus the computer carriage is moved all the way to the right, until the carriage return clutch 296 is opened by contact of the computer carriage with the carriage return termination lever 310, as described in paragraph VII.2.

Meanwhile, rocker arm 266, which also is actuated by the division key 345, operates via connecting rod 270 and actuating lever 271 to swing out the carriage arresting hook 273. (Referring to the description of paragraph VII.1.) In contrast to the multiplication operation, this hook is not engaged by the fixed stop at the left edge of the counter mechanism, but rather by ratchet pawl 252 at the left edge of the calculating mechanism, as the computer carriage is drawn to the left by spring 251 when the carriage return clutch 296 is disengaged. Contact of pawl 252 on contact surface 274 of the arresting hook 273 slides the control guide 272 towards the left again.

This actuates the main clutch 161, and thereafter the clearing clutch 175 in the manner already described in paragraph VIII.1.

Rocker arm 266 is connected with the crank 105, as previously outlined, so that depression of the division key 345 also actuates the addition clutch 122 and input clutch 134. Thus the entry value is transferred from the pin carriage into the storage mechanism.

VIII.2.—Entry of the Divisor

Upon completion of the entry of the dividend, the pin carriage is returned to its original position. The computer carriage remains in its right-hand position. When the divisor has been entered into the machine via the number keys, the division key 480 is depressed, thereby actuating rocker arms 346, 267 and 359. Rocker arm 346 again actuates engagement of the division clutch 347, so that the pin carriage 63 can slide to its extreme left-hand position.

Actuation of rocker arm 267 rotates the computer carriage ratchet out of the path of pawl 252, as previously described in paragraph VII.1.

As previously described, rocker arm 267 also actuates switch crank 105, so that the addition and gear set clutches are engaged. Thus the entry value is entered into the extreme left-hand side of the shifting mechanism.

Rocker arm 359 actuates pull rod 360 and crank 361, the latter two of which are similar to parts 270 and 271 shown in FIGURE 4. This swings the division ratchet 358 (which is mounted on a vertical axis on the control guide 272) into the path of pawl 252 on the computer carriage. Prior to this the computer carriage had been driven to its extreme right position by the carriage return clutch in the manner above described.

As shown in FIGURE 16, a rocker arm 359 has an arm 362 which runs parallel to arm 313, and which operates on crank 315 on the pin carriage main shaft 64. Rotation of arm 362 breaks the linkage by which the main drive clutch 161 actuates the cancellation clutch 175.

The first tooth of the division ratchet 358 is offset relative to contact surface 274 of the carriage arresting hook 273 in such a manner that when contact is established between pawl 252 and the first tooth of the division ratchet 358, the subtraction primary gears 221 of the calculating mechanism are positioned over the gears 12 of the storage mechanism.

Contact of pawl 252 with the division ratchet 358 will longitudinally displace the control guide 272 such that the main drive clutch is engaged, as had been previously described. Referring now to FIGURES 2, 14 and 17. The numerical value (divisor) present in the storage mechanism is now repeatedly deducted from the numerical value (dividend) present in the calculating mechanism, until the tang 364 mounted on gear 363 rotates the ratchet pawl 252 out of contact with the first tooth of the division ratchet 358. (The shape of the ratchet pawl 252 and of the tang 364 correspond to the shape of multilevers 320 and tang 321.) The counter carriage 93, under the tension of spring 151, can now make a step to the next tooth of the division ratchet 358. This results in bringing the addition gears 220 (of the same digital position as the subtraction gears 221 formerly in operation) into line with the upper gear set 12 of the storage mechanism. The value in the storage mechanism is now positively entered into the counter mechanism. The tang of gear 363 immediately again actuates pawl 252, so that the computer carriage jumps into the subtraction position of the next lower order.

Subtraction takes place in a given order until the zero position has been passed. In manual division with pencil and paper, when one sees that he has subtracted the divisor from the initial digits of the dividend as often as possible without obtaining a remainder less than zero, he must bring an additional digit into play; similarly, the mechanism of the present invention must shift to the next order when it arrives at a similar point. Since the apparatus, however, cannot anticipate whether the number (divisor) transferred from the storage mechanism to the calculating mechanism will bring the remainder in the calculating mechanism below zero, this subtraction operation is also performed. As the gear passes through zero, pawl 252 is rotated. Then the number just subtracted is again added, so that the same remainder is present in the calculating mechanism as was present just before the last subtraction operation in which a gear passed through the zero point. Passing through the zero point the second time again actuates pawl 252, and the computer carriage jumps to the next lower order. The subtraction operation now takes place in this next lower order.

The entire subtraction operation then proceeds by repetition of the above processes, and the number of subtractions in each order are recorded in the counter mechanism.

IX.—THE RE-TRANSFER OPERATION

During the re-transfer operation, a numerical value in the calculating mechanism or the counter mechanism is to be transferred to the storage mechanism. During the operation, the apparatus carries through the following operational steps:

(1) Gear sets 11 and 12 of the storage mechanism are engaged with each other (by means of the input main clutch 134).

(2) The storage mechanism, with the gear sets 11, 12 coupled together, is brought into engagement with the subtraction gears 221 of the computer carriage.

(3) Pawls 17 and 18 rotate approximately 180° in order that the projections 15 and 16 on gears 11 and 12 have no obstacles in their path during their later run. To accomplish this, the rotation of the storage controlling main clutch 161 is stopped after approximately 150° of rotation, by help of a return drive clutch.

(4) The gear sets 11 and 12 are disengaged from each other.

(5) The numerical values present in the computer carriage mechanisms are transferred to the upper gears 12 by driving the meshing cancellation gear 235 and gears 234. According to the position of the computer carriage either the value from the calculating mechanism or the value from the counter mechanism is thus retransferred.

(6) The gear sets 11 and 12 are again coupled to each other.

(7) The storage mechanism is disengaged from the gears of the computer carriage by again engaging the main clutch 161.

(8) By rotation of the pawls 17, 18, the upper gears 12 are set back to zero, thereby transferring the numerical value to the lower gears 11. This value can then be used in further addition, subtraction, multiplication or division operations. To accomplish any one of these further operations, as soon as the retransfer operation is completed, one need only depress the appropriate function key, without the necessity of entering a new value via the number keys 50.

These operational steps are controlled as follows:

As shown in FIGURE 23, the re-transfer key 365 operates on rocker arm 366, which is mounted on shaft 367 and has a shape similar to that of rocker arm 292. The rocker arm has two extension arms 368 and 381. Arm 368 operates on a crank 369 mounted on shaft 64. Another crank arm 316 on the same shaft lifts push rod 171 so as to interrupt the linkage through which the main clutch 161 actuates the clearing clutch 175.

Re-transfer key 365 has another tang which operates on rocker arm 372 mounted on shaft 370. Shaft 370 carries on its other end, on the opposite side of the apparatus, an arm 371 (see FIGURE 18) which rotates rocker arm 255, whereupon the addition operation described above under section VI is carried out. The counter carriage 93 is thereby pushed into the subtraction position, and the addition clutch 122 and the input main clutch 134 are actuated through crank 105. During this operation stop plate 7 for the value entry rods 9 is also lifted. However, the value entry rods 9 are blocked by the zero rail 373 of the pin carriage. This is shown in FIGURE 3. The subtraction position is required because the drive direction of the release gears is fixed, and also because the gears of the upper gear set 12 may be rotated only in one direction during the re-transfer operation, due to the position of the wheel projections 15 and 16 relative to the tangs. Main clutch 134 also actuates the main clutch 161 through push rod 153, so that as already described, the gears 12 of the storage mechanism engage with the subtraction primary gears 221 of the calculating mechanism or of the counter mechanism.

As outlined above, the main clutch 161 does not turn a full revolution, but comes to stop after a rotation of approximately 150°. This interruption is accomplished by the return drive clutch 375.

The return drive clutch 375 is actuated in a manner similar to that of the other clutches. A pull rod 382 is mounted on the extension arm 381 of the rocker arm 366. On the free end of the pull rod 382 is linked a crank 384 mounted on shaft 383. Also on shaft 383 is mounted a trip lever 374 of the return drive clutch 375. The lower arm 385 of the trip lever serves, in the same manner as with all the other clutches, to actuate a crank 386 mounted on shaft 113 to operate the start switch 115.

The gears 387 and 388 drive the return drive clutch 375. Three cam plates 390, 392 and 404 are driven by the return drive clutch.

The temporary opening of the main clutch 161 is controlled by the cam plate 390. On cam plate 390 is mounted a pin 393 which contacts a V-shaped lever 380. Lever 380 is mounted on shaft 379, to which a detent lever 378 is also keyed. This detent lever 378 hooks over a pin on locking lever 377 on the main clutch 161. When cam plate 390 rotates the V-shaped lever 380, detent lever 378 releases the locking lever 377 so that it can swing into the path of the ratchet pawl 161' of the main clutch 161. When the main drive clutch 161 rotates, locking lever 317 lifts ratchet pawl 161' so that the clutch 161 is disengaged. The locking lever 377 is pivotally mounted on shaft 143. Cam plate 392, which is driven by the return drive clutch 375, carries a pin 394, which operates on lever 395 keyed to shaft 143. When the pin 394 contacts lever 395 a rotational movement is transmitted to shaft 143, which uncouples the gear sets 11 and 12 from each other. This is shown in FIGURE 7.

The drive of the clearing gears on the counter carriage is similarly initiated by cam plate 392. As shown in FIGURE 3, cam plate 392 carries an additional pin 396 which actuates slide 397. As shown in FIGURE 13, this slide acts through arm 398, crank 399 and rod 400 to transfer a motion to arm 244. Thus the clutch for the calculating mechanism, and in the present embodiment of the invention also the clutch for the clearing of values in the counter mechanism, are actuated. The cancelled numerical value is thereby entered into the upper gear set 12 of the storage mechanism.

Referring now to FIGURE 21. Upon further rotation of the cam plate 390, a pin 405 mounted thereon contacts the surface 401 of the V-shaped lever 395. The resulting rotation is transferred to shaft 143, to which lever 395 is keyed. Rotation is in such a direction as to cause the gear sets 11 and 12 of the shifting mechanism to again become coupled.

Cam plate 404 which also is driven by the return drive clutch 375 has a projection 402 which rotates the V-shaped lever 308 in such a manner that the slant surface 403 of the detent lever 378 pulls the locking lever 377 away from the main clutch 161, so that this clutch is engaged again, and the interrupted rotational movement of the main clutch 161 is resumed. The numerical value in the upper gears 12 is thereby entered into the lower gears 11 of the storage mechanism.

At the end of the revolution the main clutch 161 disengages itself automatically by virtue of the ratchet pawl 161' engaging the trip lever, without initiating engagement of the clearing main clutch 175.

X.—MULTIPLICATION BY A CONSTANT FACTOR

The apparatus of the present invention provides an arrangement whereby during the multiplication operation a constant factor can be immediately entered again into the multiplier mechanism, without the necessity of re-keying the multiplier every time. This is accomplished by transferring the multiplier from the counter mechanism into gear racks during the multiplication and clearing operations. The multiplier can be re-transferred from the racks back to the counter mechanism. Referring now to FIGURES 17 and 24. The several number wheels 217 are mounted to rotate on shaft 410. To each number wheel is fixed a small ten tooth gear 409, which can engage a gear rack 406. Each gear rack 406 is guided between a separation plate 411 on one side and a number wheel 217 on the other. The racks 406 are also guided on their lower halves between two horizontal rods 407 and 408. In addition leaf spring 415 presses against the lower part of each rack 406.

As shown in FIGURE 24 the leaf spring 415 tends to rotate the rack clockwise about the pivot between the rods 407 and 408 and thus to keep the rack out of engagement with its corresponding gear 409. To counteract this tendency, a horizontal rod 412 runs across the upper halves of the racks. Rod 412 is mounted with both ends on eccentric levers 413, which in turn are mounted on an eccentric 424 on shaft 425. Shaft 425 is mounted to rotate in the housing of the counter carriage. A lever (not shown for sake of clarity) allows moving shaft 425 in such a manner that the rod 412 may occupy selectively a position corresponding either to that of the shortest distance from shaft 420 or to that of the greatest distance from shaft 425.

When the rod 412 occupies the position corresponding to the shortest distance from shaft 420, the racks 406 are engaged with the corresponding gears 409. When the rod 412 occupies the position corresponding to that of the greatest distance from shaft 425, racks 406, in response to action of spring 415, pivot such that they are disengaged from gears 409.

As shown in FIGURE 14, upon entry of the multiplier into the counter mechanism racks 406 are engaged with gears 409 by the manual pivoting of a lever parallel to lever 414, which transmits a rotation to shaft 425. During the following multiplication operation the multiplier is returned to zero. Racks 406 are advanced in the same proportion, so that the multiplier at the end of the multiplication operation is recorded in the racks.

In FIGURE 17 are shown the sidewalls 419 of the counter mechanism with slots running parallel to rods 406. A horizontal rod 420 passes through the slots, with connecting straps 421 linked to its ends. The other ends of straps 420 are in turn linked with arms 417, mounted on shaft 416. The manual lever 414, maintained in its rest position by spring 423, is mounted on the outer end of arm 417.

When it is desired to re-enter the value present in the racks back into the counter mechanism the rod 420 is moved by the manual lever 414 longitudinally downward in slots 418 in the direction of the racks 406. Thus the rod 420 engages the front ends 422 of the rods 406 and returns them to their original positions. The value present in the racks is thus re-transferred to the number wheels 217 in the counter mechanism.

The apparatus has another special feature in that the result of a multiplication operation may be added to a value appearing in the counter mechanism, or subtracted therefrom. When the positive multiplication key (×=pos) is depressed the multilevers 320 become engaged with the tooth 319 of a lever mounted on control guide 272, in the manner described above.

When the negative multiplication key (×=neg) is depressed, a lever corresponding to the lever 312 shown in FIGURE 14 is swung on the control-guide 272 in such a manner that its tooth 426 is interposed into the path of the multilevers 320. The tooth 426 is displaced relative to the tooth 319 in such a manner that instead of the addition gears 220 the subtraction gears 221 of the calculating mechanism engage the shifting mechanism. Thereby the result of a multiplication operation is deducted from a number entered in the calculating mechanism.

XI.—THE SPECIFIC EMBODIMENT OF THE PRESENT INVENTION

The embodiments of the invention shown in FIGURES 1, 2, 3b and 28a to 31 present an improvement over the calculator of the parent patent application. In accordance with the present invention, two function keys are provided for carrying out divisions. The first function key effects simultaneous movement of the computer carriage 93 to the right, and of the pin carriage 63 to the left to the position shown in FIG. 27. The second function key 481 effects movement of the computer carriage 93 from the left end position to the right end position, as shown in FIGS. 28a and 28b without, however, effecting movement of the input carriage 63. In contrast to the operation described with reference to FIGS. 26 and 27, the divisor is not subtracted in the highest orders of the calculator. Assuming that the dividend is entered in the lowest orders of the calculator, as shown in FIG. 28a, and the input carriage 63 remains in the position of FIG. 28a after the computer carriage 93 has been shifted to the right end position shown in FIG. 28b, the divisor will be entered in orders of the calculating mechanism which are neither the highest nor the lowest orders, assuming a certain relationship between the order numbers of the dividend and divisor. If the numbers of orders of the divisor is not as great as the number of orders of the storage mechanism 11, 12, the highest orders of the calculating mechanism 93 will be free, as shown in FIG. 28b.

This arrangement has a particular advantage, if the divisor was not purposely entered in the lowest orders of the calculating mechanism, but is there as a result of previous additions or subtractions which are carried out in the lowest orders of the calculating mechanism. If in this event, the operation described with reference to FIGS. 26 and 27 would be carried out, the divisor would be entered in the highest orders of the calculator, and during the successive subtractions, the first orders of the quotient indicated by the counter mechanism would be zero, and when the highest order of the divisor is located at the highest order of the dividend, the orders of the counter mechanism may be used up by zeros, so that few or even a single order would appear in the quotient.

In the arrangement of FIGS. 28a and 28b, this is avoided, since due to the entry of the divisor in the middle orders of the calculating mechanism, only a few zero positions will appear in the highest orders of the counter mechanism.

The advantage particularly is apparent if the dividend has a great number of orders, and if the number of orders of the divisor is not smaller than the number of orders by which the dividend exceeds the number of orders of the storage mechanism. This is due to the fact that during the shifting of the calculator carriage 93 to the right, the calculating mechanism is shifted a distance corresponding to the number of orders of the storage mechanism 11 and 12. In the calculating machine of the invention, the storage mechanism has eight orders, and after the shifting of the calculator carriage to the right, the lowest order of the storage mechanism cooperates with the eighth order of the calculator mechanism.

The arrangement of the present invention permits the operator to enter the divisor either in the highest orders of the calculating mechanism, or in middle orders of the calculating mechanism, according to the position of the dividend, whereby the highest number of meaningful orders of the quotient can be obtained. It will be understood that the operation described with reference to FIGS. 28a and 28b is not advantageous if the number of orders by which the dividend exceeds the number of orders of the storage mechanism 11, 12 is greater than the number of orders of the divisor. The function key 480 actuates the rocker arms 267, 346, 359 and 291. When key 480 (FIGURES 1 and 3B) is operated, arm 268 (FIGURE 4) of rocker arm member 267 turns lever 269 which moves addition rail 264 (FIGURES 4 and 21) out of the path of division lever 252, so that rack bar end 253 of rail 264 cannot engage lever 252. By depressing the key 480 the addition rail is displaced until stops thereon are carried out of the path of the computer carriage ratchet pawl 252. In addition the carriage release rocker arm 267 commences the operation of the apparatus. As described with reference to FIGURE 3B and FIGURE 11, actuation of the divisional rocker arm 346 permits linear movement of the pin carriage 63 which passes by under the influence of spring means to the left until the highest digit comes into engagement with the plane of the highest digit of the storage mechanism 11, 12 as shown in FIG. 27. The depression of key 480 also swings the ratchet rocker arm 359, whereby a second division rail is swung through a rod system into the path of a pin on the carriage 93 wherein a clutch prevents cancellation of the values entered into the storage mechanism. The carriage return clutch actuating rocker arm 291 fits in cooperation with the carriage return clutch which pulls the computer carriage 93 to its extreme right position, whereby the highest digit of the calculating mechanism is in a plane of engagement with the highest digit of the storage mechanism 11, 12 as shown in FIG. 27. All the above parts and elements are described hereinabove.

As best seen in FIG. 3b, the function key 481 of the embodiment here described actuates only rocker arms 267, 359 and 291, but not the rocker arm 346. Therefore upon entry of a number into the pin carriage, the pin carriage does not pass to the left, but remains in the position into which it arrived. Therefore, the lowest digital position occupied by the number which was entered is in an engagement position with the lowest digit in the storage mechanism.

By depressing function key 480 the divisor, entered into the pin carriage, is entered in the extreme left margin of the storage mechanism 11, 12. However, by depressing the function key 481 (division key), the value entered in the pin carriage is transferred into the right margin digits of the storage mechanism as shown in FIG. 28a.

In the event that a divisor has the same number, or a greater number of orders than the dividend, it is most advantageous not to enter the dividend in the highest orders of the calculating mechanism, as described with reference to FIG. 27, or in the lowest orders of the calculating mechanism as described with reference to FIGS. 28a and 28b, but in the middle orders of the calculating mechanism 93, as will now be described generally with reference to FIGS. 29a and 29b, and then specifically with reference to FIGS. 2, 30 and 31.

A tabulator means is provided which effects shifting of the calculator carriage to its right hand end position as shown in FIG. 29a, and this tabulating means is used before the dividend is entered into the calculator mechanism so that the relative position between the storage means 11, 12 and the calculating mechanism is as shown as in FIG. 29a. The dividend is first entered into the input carriage 63, then transferred to the storage mechanism 11, 12, and from there transferred into the calculating mechanism, and since the value is entered into the lower orders of the storing mechanism, it will be entered into the middle orders of the calculating mechanism. Consequently, the calculating operations can be carried out where sufficient higher orders are available. If a divisor is entered into the calculating mechanism, as shown in FIG. 29b, the operations take place at the center of the calculating mechanism, and if the divisor has the same number of orders, or a greater number of orders than the dividend, the orders of the storage mechanism 11, 12 are better utilized, and a smaller number of machine cycles will be necessary until the highest order of the divisor is entered into the order of the calculating mechanism where the highest order of the dividend was entered. Consequently, the counter mechanism will be better utilized to indicate in its orders meaningful digits of the quotient.

Assuming, for example a dividend of four orders, and a divisor of four orders, the quotient will have a single meaningful order, in addition to zeros, if the arrangement of FIGS. 28a and 28b is used. In the arrangement of FIGS. 28a and 28b, however, the quotient will have eight meaningful orders, which, in the arrangement of the present invention, are all the orders of the counter mechanism.

However, if the number of orders of the divisor is smaller than the number of orders of the dividend, then an idle run of the machine can only be avoided if the divisor is entered into the calculating mechanism in a position in which its highest order is located in an order of the calculating mechanism which is higher, or the same order as the order in which the highest order of the dividend is entered.

This can be effected in two ways. Either the dividend is entered in the lowest orders of the calculating mechanism and the operation is carried out as described with reference to FIGS. 28a and 28b, or the tabulating means is used as described with reference to FIGS. 29a and 29b, and the dividend is entered in the middle orders of the calculator mechanism, while the pin carriage is shifted to its left end position, as described with reference to FIG. 27.

Assuming a storage mechanism of eight orders, the two possibilities are not exactly equivalent since in the right end position of computer carriage 93, the lowest order of the storage mechanism 11, 12 already cooperates with the eighth order of the calculating mechanism. In the operation of FIG. 28b, a five order dividend and a three order divisor will produce a three order quotient, and in the arrangement in which the dividend is entered, as shown in FIG. 29a, and the divisor is entered in the highest orders of the calculator, the quotient will have five orders.

In order to obtain the position of the pin carriage 63 shown in FIG. 29b, the calculating mechanism is provided with an ordinally arranged set of calculator stops which are so arranged and constructed that only the calculator stop of the highest order in which a number, namely the dividend, was entered, projects into the path of movement of a stop on the pin carriage 63. In this manner, the pin carriage is stopped so that its highest order cooperates with the highest order of the calculator mechanism in which the dividend was entered.

FIGURES 2, 30 and 31 show the arrangement which is used to hold the pin carriage during passing at the highest occupied digit of the calculating mechanism.

A slide 505 is movably mounted on the pin carriage as shown in FIG. 2. The slide 505 may be elevated by the pin carriage shift ratchet 85. This shift ratchet 85 is provided with a toothed rod 86 cooperating with an extension 87 of pin carriage 63, as shown in FIGS. 2 and 20 and when the toothed rod 86 is retracted from extension 87 of the pin carriage, the pin carriage is free to pass to the left. This turning movement of ratchet 85 raises the slide 505 in FIGURE 2. Thereby its upper end comes into a position for engagement with stop rods 501 which are controlled by the calculating mechanism. The lever 85 is turned by member 81 in counter-clockwise direction when a key 50 is depressed, and turns clockwise when the key is released. When after entry of the divisor function key 480 is operated, a clutch (not shown) is actuated and turns lever 85 while holding slide 505 in raised position until slide 505 has moved so far left that the upper end of slide 505 is engaged by bars 501 which are controlled by the counter mechanism. Slide 505 remains in raised position to the end of the division. Then member 81 is returned by spring 89, and slide 505 drops down.

This control occurs in such a manner that always only the stop rods of the highest order occupied by a digit protrude into the path of the slide 505 while the stop rods of the lower orders occupied by digits and the rods of the higher orders unoccupied by digits do not protrude into this path. The stop rods are linked together in such a manner that the rod which is in position of engagement is pushed out of the path of the pin carriage when the rod of a higher digit enters into a position of engagement.

A lever 503 is mounted pivotally on the cancellation gear shaft 232. The lever 503 has an arm 503' which cooperates with a curved disk 504, mounted on the counter carriage intermediate gear 231. The curved disk 504 is notched, the position of the notch corresponding to zero position so that at the zero position the arm 503' engages this notch. In this position lies also a stop rod 501, pivotally mounted on lever 503 to pin 506. In the zero position lever 501 is not in the path of the elevated slide 505 passing when the pin carriage 63 is moved to the left. Since the curved disk 504 only has one notch indicating the zero position, when a number other than zero is applied to this corresponding order of the calculating mechanism, the lever 503 is moved counterclockwise and the stop rod 501 is pushed forward into the path of the slide 505. In order to permit the pin carriage to move to the last occupied order, it is necessary that only the stop rod of the highest occupied order is operative while the stop rods of the next lower orders do not project into the path of the pin carriage.

This is accomplished by providing each lever 503 with a side piece 502 attending at an angle from lever 503. The arm 502 extends into the vicinity of the stop rod 501 of the next lower diigt and engages an angled extension 508 of its corresponding stop rod. Therefore when a number from one to nine of the next digit moves the lever 503 out of the notch of the curved disk 504 the stop rod of the next lower digit is moved thereby towards and out of the path of edge 8 of the slide 505. Then the pin carriage can move to the left until the edge of slide 505 strikes against the stop rod 501 of the highest occupied digit. In different embodiments of the invention a counter stop fixed to the pin carriage may be substituted for the slide 505.

If one or several zeros appear in the numerals of the dividend, for instance, when the dividend comprises the number 8007, an additional arrangement is necessary to permit lifting out of the path of the pin carriage the stop rod corresponding to the number 7 over the two zero positions by the highest digit occupied by the number 8. This is because the stop rod 501 of the next lower digit is elevated by the side piece 502 of the digit occupied by the number 8, the lever 503, however, is not moved by this next lower digit in view of the fact that there is only a zero in this lower digit. Therefore the stop rod of the second next digit and also the stop rod of the next lower digit which is occupied by the number 7 are not lifted.

For such a purpose the stop rods themselves are provided with an angular member 507, which always reaches under the stop rod of the next lower digit. When keying in the given example number, 8007, the side piece 502 of the lever 503 of the numeral 8 lifts the stop rod 501 of the numeral 0. The angular member 502 of this last mentioned stop rod in turn reaches under the stop rod 501 of the next lower digit and so on. Thus all stop rods up to the highest occupied digit are moved out of the path of the pin carriage. This assures that each next higher digit causes the moving out of the stop rods also when there are zero positions in between the numerals.

In another embodiment of the invention the mechanism which causes the holding of the pin carriage on its last occupied digit is developed so that the stop rods do not reach into the path of the pin carriage upon the entry of a numeral from 1 to 9, as it is in the previous embodiment, but only when the numeral is zero. Since above the highest occupied order there are always only additional zeros, the pin carriage passes through until it hits the stop pin of the first zero past the highest occupied digit. To prevent the pin carriage from stopping against the stop rod of a zero, when such occurs in between the numerals of the dividend, the stop rod for such a purpose is made integral with the lever 503 and provided with an angular portion which reaches under the stop rail of the lower digit so that all stop rods which are behind an occupied digit are pushed out of the path of the pin carriage.

In still another embodiment of the invention care is taken to utilize fully the capacity of the counter mechanism also when the digital number of the divisor is greater than that of the dividend. In such a case, as already described hereinabove, the dividend is entered in the middle of the calculating mechanism. Upon entry of the divisor into the pin carriage the second key is depressed and the computer carriage is brought at first further to the right out of the position into which the dividend is brought in the middle of the calculating mechanism. Thereafter the computer carriage falls back again into this position and from this position out it counts the individual digits. The manner of moving the calculating carriage also has been described hereinabove.

In this last mentioned embodiment it is not required to count the unoccupied digits of the calculating mechanism in view of the fact that the carriage is not stopped at the stops corresponding to an unoccupied position. These stops are removed out of the path of the stop of the computer carriage so that only that stop must be counted as the first stop in which the calculating mechanism is occupied. The last two mentioned embodiments of the invention in combination produce a calculator with which it is possible to carry out mixed divisions and irrespective of whether or not the digital number of the divisor is greater than the digital number of the dividend, the capacity of the counter mechanism always is fully exploited and thereby always the highest possible number of digits past the decimal point may be obtained.

It should be understood, of course, that the foregoing disclosure relates to preferred embodiments of the invention and that it is intended to cover all changes and modifications of the examples of the invention herein chosen for the purposes of the disclosure, which do not constitute departures from the spirit and scope of the invention set forth in the appended claims.

We claim:
1. In a calculator, in combination,
an input carriage having a set of ordinally arranged input means and being movable between a first end position and a second end position;
a calculator carriage including a set of ordinally arranged calculating means and being movable between a first end position and a second end position, the input means of the highest order being aligned with said calculating means of the highest order in said first end positions of said input carriage and calculator carriage;
control means for effecting movement of said calculator carriage and of said input carriage from said second end position to said first end position thereof to obtain entry of a dividend by said input means in calculating means of selected orders; and
calculator stop means disposed on said calculator carriage and being operable to block movement of said input carriage in a selected position in which the input means are respectively aligned with calculating means of selected orders between the highest and lowest orders to cause entry of a divisor in said calculating means of said selected orders so that the divisor can be repeatedly subtracted from the dividend during a division for obtaining a quotient having a desirable number of orders.

2. In a calculator, in combination,
an input carriage having a set of ordinally arranged input means and being movable between a first end position and a second end position;
a calculator carriage including a set of ordinally arranged calculating means and being movable between a first end position and a second end position, the input means of the highest order being aligned with said calculating means of the highest order in said first end positions of said input carriage and calculator carriage;
first control means for effecting simultaneous movement of said calculator carriage and of said input carriage from said second end positions to said first end positions so that a dividend and a divisor can be successively transferred from said input means to said calculator means of the highest orders; and
second control means for effecting movement of said calculator carriage from said second end position to said first end position thereof to obtain entry of a dividend by said input means in calculating means of selected orders, and for placing said input carriage in a selected position in which the input means are respectively aligned with calculating means of selected orders between the highest and lowest orders to cause entry of a divisor in said calculating means of said selected orders so that the divisor can be repeatedly subtracted from the dividend during a division for obtaining a quotient having a desirable number of orders.

3. In a calculator, in combination,
an input carriage having a set of ordinally arranged input means and being movable between a first end position and a second end position;
a calculator carriage including a set of ordinally arranged calculating means and being movable between a first end position and a second end position, the input means of the highest order being aligned with said calculating means of the highest order in said first end positions of said input carriage and calculator carriage;
first control means for effecting simultaneous movement of said calculator carriage and of said input carriage from said second end positions to said first end position so that a dividend and a divisor can be successively transferred from said input means to said calculator means of the highest orders; and
second control means for effecting movement of said calculator carriage from said second end position to said first end position thereof after entry of a dividend by said input means in calculating means of the lowest orders, and for maintaining said input carriage in the position assumed thereby after entry of the dividend so that the input means are respectively aligned with calculating means of selected orders between the highest and lowest orders to cause entry of a divisor in said calculating means of said selected orders so that the divisor can be repeatedly subtracted from the dividend during a division for obtaining a quotient having a desirable number of orders.

4. In a calculator, in combination,
an input carriage having a set of ordinally arranged input means and being movable between a first end position and a second end position;
a calculator carriage including a set of ordinally arranged calculating means and being movable between a first end position and a second end position, the input means of the highest order being aligned with said calculating means of the highest order in said first end positions of said input carriage and calculator carriage;
a stationary storage mechanism including a set of ordinally arranged storage means for respectively transferring numerical values from said input means to said calculator means, and for re-entering the values in said input means, the calculating means of the highest order being aligned with said storage means of the highest order in said first end position of said calculator carriage;

first control means for effecting movement of said calculator carriage and of said input carriage from said second end positions to said first end position so that a dividend and a divisor are successively transferred from said input means to said calculator means of the highest orders; and second control means for effecting movement of said calculator carriage from said second end position to said first end position thereof after entry of a dividend by said input means in calculating means of the lowest orders, and for maintaining said input carriage in the position assumed thereby after entry of the dividend so that the input means are respectively aligned with calculating means of selected orders between the highest and lowest orders to cause entry of a divisor in said calculating means of said selected orders so that the divisor can be repeatedly subtracted from the dividend during a division for obtaining a quotient having a desirable number of orders.

5. In a calculator, in combination, an input carriage having a set of ordinally arranged input means and being movable between a first end position and a second end position;

a calculator carriage including a set of ordinally arranged calculating means and being movable between a first end position and a second end position, the input means of the highest order being aligned with said calculating means of the highest order in said first end positions of said input carriage and calculator carriage;

first control means for effecting simultaneous movement of said calculator carriage and of said input carriage from said second end positions to said first end positions so that a dividend and a divisor can be successively transferred from said input means to said calculator means of the highest orders;

second control means for effecting movement of said calculator carriage from said second end position to said first end position thereof to obtain entry of a dividend by said input means in calculating means of selected orders, and for maintaining said input carriage in the position assumed thereby after entry of a dividend; and stop means controlled by the calculating means of the highest order in which a digit of the dividend is stored to stop movement of said input carriage in a selected position in which the input means of the highest order is aligned with the calculating means of the highest order in which a digit of the dividend is stored to cause entry of a divisor in said calculating means of said highest orders so that the divisor can be repeatedly subtracted from the dividend during a division for obtaining a quotient having a desirable number of orders.

6. In a calculator, in combination, an input carriage having a set of ordinally arranged input means and being movable between a first end position and a second end position;

a calculator carriage including a set of ordinally arranged calculating means and being movable between a first end position and a second end position, the input means of the highest order being aligned with said calculating means of the highest order in said first end positions of said input carriage and calculator carriage;

first control means for effecting movement of said calculator carriage and of said input carriage from said second end positions to said first end position so that a dividend and a divisor can be successively transferred from said input means to said calculator means of the highest orders;

second control means for effecting movement of said calculator carriage from said second end position to said first end position thereof to obtain entry of a dividend by said input means in calculating means of selected orders; and blocking means for blocking movement of said input carriage in a selected position in which the input means of the highest order is aligned with the calculating means of the highest order in which a digit of the dividend is stored, said blocking means including stop means controlled by the calculating means of the highest order of the dividend to stop the movement of said input carriage in said selected position whereby a divisor is entered in said calculating means of said highest orders so that the divisor can be repeatedly subtracted from the dividend during a division for obtaining a quotient having a desirable number of orders.

7. In a calculator, in combination, an input carriage having a set of ordinally arranged input means and being movable between a first end position and a second end position;

a calculator carriage including a set of ordinally arranged calculating means and being movable between a first end position and a second end position, the input means of the highest order being aligned with said calculating means of the highest order in said first end positions of said input carriage and calculator carriage;

control means including a control key for effecting movement of said calculator carriage and of said input carriage from said second end positions to said first end position so that a dividend and a divisor can be successively transferred from said input means to said calculator means of the highest orders;

tabulator means including a tabulator key for effecting movement of said calculator carriage from said second end position to said first end position thereof to obtain entry of a dividend by said input means in calculating means of selected orders between the highest and the lowest orders; and calculator stop means disposed on said calculator carriage and being operable to block movements of said input carriage in a selected position in which the input means of the highest order is aligned with the calculating means of the highest order in which a digit of the dividend is stored to cause entry of a divisor in said calculating means of said highest orders so that the divisor can be repeatedly subtracted from the dividend during a division for obtaining a quotient having a desirable number of orders.

8. In a calculator, in combination, an input carriage having a set of ordinally arranged input means and being movable between a first end position and a second end position, said input carriage including a stop;

a calculator carriage including a set of ordinally arranged calculating means, and set of ordinally arranged calculator stops, the calculator stop of the highest order in which a number is entered being located for engaging said stop of said input carriage during movement of said pin carriage for stopping said input carriage in a position in which the input means of the highest order is aligned with the calculating means of the highest order in which a number is entered, said calculator carriage being movable between a first end position and a second end position, the input means of the highest order being aligned with the calculating means of the highest order in said first end position of said input carriage and said calculator carriage, first control means for effecting movement of said calculator carriage and of said input carriage from said second end positions to said first end positions so that a dividend and a divisor can be successively transferred from said input means to the calculating means of the highest orders;

and second control means for effecting movement of only said calculator carriage from said second end position to said first end position thereof to obtain transfer of a dividend from said input means to the calculating means of selected orders between the highest and lowest orders, said calculator stop means of the highest order of the calculator means in which a number is entered blocking said input carriage in a position in which the input means of the highest order is aligned with the calculating means of the highest order in which a digit of the dividend is stored to cause entry of a divisor in said calculating means in the orders in which the dividend is stored so that the divisor can be repeatedly subtracted from the dividend during a division for obtaining a quotient having a desirable number of orders.

9. A calculator as set forth in claim 8 wherein said calculator carriage includes a set of ordinally arranged cam discs engaged by said calculator stops, respectively and holding said calculator stops in an inoperative position not cooperating with said stop of said input carriage when the respective calculating means are in zero position and effecting movement of said calculator stops to an operative blocking position cooperating with said stop of said input carriage when a number is entered in the respective calculating means, said calculator stops being operatively connected so that each calculator stop in operative blocking position holds the calculator stops of the lower orders in said inoperative position so that only the calculator stop of the highest order in which a number is entered is in said operative blocking position.

10. A calculator as set forth in claim 9 wherein each calculator stop includes a lever means cooperating with the respective cam discs, and a stop member pivotally mounted on said lever means, each lever means having an arm cooperating with said stop member of the next lower order.

11. A calculator as set forth in claim 10 wherein each stop member has an arm cooperating with the stop member of the next lower order for holding the same in an inoperative position.

12. In a calculator in combination, an input carriage having a set of ordinally arranged input means and being movable between a first end position and a second end position;

a stop on said input carriage;

a calculator carriage including a set of ordinally arranged calculating means and being movable between a first end position and a second end position, the input means of the highest order being aligned with said calculating means of the highest order in said first end positions of said input carriage and calculator carriage;

tabulator means for effecting movement of said calculator carriage from said second end position to said first end position thereof to obtain entry of a dividend by said input means in calculating means of selected orders between the highest and the lowest orders;

first control means for effecting movement of said calculator carriage and of said input carriage from said second end positions to said first end position;

so that a dividend and a divisor are successively entered by aid input means in said calculator means of the highest orders; and second control means including calculator stop means on said calculator carriage and being controlled by the calculating means of the highest order of the dividend to move to a position engaging said stop for stopping said input carriage in a selected position in which the input means of the highest order cooperates with the calculating means of the highest orders to enter a divisor in said calculating means of said highest orders so that the divisor can be repeatedly subtracted from the dividend during a division for obtaining a quotient having a desirable number of orders.

References Cited in the file of this patent

UNITED STATES PATENTS

| | | |
|---|---|---|
| 1,878,125 | Fuller | Sept. 20, 1932 |
| 2,281,851 | Mehan | May 5, 1942 |
| 2,603,417 | Pinckney | July 15, 1952 |
| 2,721,698 | Gang | Oct. 25, 1955 |
| 2,821,342 | Capellaro | Jan. 28, 1958 |
| 2,834,542 | Sundstrand | May 13, 1958 |
| 2,886,238 | Plunkett | May 12, 1959 |
| 2,911,142 | Malavazos | Nov. 3, 1959 |